United States Patent
Miley et al.

(10) Patent No.: US 8,603,405 B2
(45) Date of Patent: Dec. 10, 2013

(54) POWER UNITS BASED ON DISLOCATION SITE TECHNIQUES

(71) Applicant: NPL Associates, Inc., Champaign, IL (US)

(72) Inventors: George H. Miley, Champaign, IL (US); Xiaoling Yang, Branford, CT (US)

(73) Assignee: NPL Associates, Inc., Champaign, IL (US)

( * ) Notice: Subject to any disclaimer, the term of this patent is extended or adjusted under 35 U.S.C. 154(b) by 0 days.

(21) Appl. No.: 13/892,879

(22) Filed: May 13, 2013

(65) Prior Publication Data

US 2013/0295512 A1  Nov. 7, 2013

Related U.S. Application Data

(63) Continuation-in-part of application No. 13/414,300, filed on Mar. 7, 2012, now Pat. No. 8,440,165, which is a continuation-in-part of application No. 12/080,011, filed on Mar. 31, 2008, now Pat. No. 8,227,020.

(60) Provisional application No. 60/920,659, filed on Mar. 29, 2007.

(51) Int. Cl.
   *C01B 3/02* (2006.01)
   *B82Y 30/00* (2011.01)

(52) U.S. Cl.
   USPC ............................. 422/198; 422/211; 977/948

(58) Field of Classification Search
   USPC ........... 96/108; 95/90, 116; 423/647.7, 648.1, 423/210; 422/129, 198, 211; 977/948
   See application file for complete search history.

(56) References Cited

U.S. PATENT DOCUMENTS

| | | | |
|---|---|---|---|
| 4,902,572 A | 2/1990 | Horne et al. |
| 4,959,242 A | 9/1990 | Itoh |
| 5,313,067 A | 5/1994 | Houk et al. |
| 5,487,078 A | 1/1996 | Rhodes et al. |
| 6,599,404 B1 | 7/2003 | Miley |
| 6,831,362 B2 | 12/2004 | Ha et al. |
| 6,921,469 B2 | 7/2005 | Larsen |
| 6,972,247 B2 | 12/2005 | Bedell et al. |

(Continued)

OTHER PUBLICATIONS

Lipson, A et al.; Transport and Magnetic Anomalies Below 70 K in a Hydrogen-Cycled Pd Foil with a Thermally Grown Oxide; Physical Review B 72, 212507 (2005); The American Physical Society.

(Continued)

*Primary Examiner* — Frank Lawrence, Jr.
(74) *Attorney, Agent, or Firm* — Krieg DeVault LLP

(57) ABSTRACT

A distributed energy system includes a gas-loaded heat generator capable of producing a thermal energy. The system includes a gas source to provide one or more isotopes of hydrogen, a plurality of metallic micro-structures, a gas loading chamber containing the plurality of metallic micro-structures. The gas loading chamber is structured to receive the one or more isotopes of hydrogen from the gas source. The system also includes a gas loading system capable of providing a gas loading pressure to the gas loading chamber containing the plurality of metallic micro-structures with an amount of one or more isotopes of hydrogen to form hydrogen clusters. In one form, the system further includes a thermal transducer capable of converting a first portion of the thermal energy. In still another form, the system additionally includes a waste heat recovery device capable of applying a second portion of the thermal energy.

22 Claims, 21 Drawing Sheets

(56) References Cited

U.S. PATENT DOCUMENTS

| | | |
|---|---|---|
| 7,244,887 B2 | 7/2007 | Miley |
| 2001/0019594 A1 | 9/2001 | Swartz |
| 2002/0090047 A1* | 7/2002 | Stringham .................. 376/100 |
| 2003/0144151 A1 | 7/2003 | Tripodi |
| 2007/0059452 A1 | 3/2007 | Debe et al. |
| 2008/0070397 A1 | 3/2008 | Lochtefeld et al. |
| 2008/0123793 A1* | 5/2008 | Loan et al. .................. 376/156 |
| 2009/0086877 A1* | 4/2009 | Hagelstein et al. ........... 376/100 |

OTHER PUBLICATIONS

Nagel, D.J. et al.; Energetics of Defects and Strains in Palladium; Tenth International Conference on Cold Fusion, 2003; Cambridge, MA.

Kim, Y.E. et al.; Proposal for New Experimental Tests of the Bose-Einstein Condensation Mechanism for Low Energy Nuclear Reaction and Transmutation Processes in Deuterium Loaded Micro- and Nano-Scale Cavities; 11th International Conference on Condensed Matter Nuclear Science, 2004, Marseille, France.

Kim, Y.E. et al., Mixtures of Charged Bosons Confined in Harmonic Traps and Bose-Einstein Condensation Mechanism for Low Energy Nuclear Reactions and Transmutation Processes in Condensed Matter; 11th International Conference on Condensed Matter Nuclear Science, 2004, Marseille, France.

Kim, Y.E. et al., Alternative Interpretation of Low-Energy Nuclear Reaction Processes with Deuterated Metals Based on the Bose-Einstein Condensation Mechanism; 11th International Conference on Condensed Matter Nuclear Science, 2004, Marseille, France.

Kresge, C.T. et al.; Ordered Mesoporous Molecular Sieves Synthesized by a Liquid-Crystal Template Mechanism; Nature, Oct. 22, 1992; vol. 359; Nature Publishing Group.

Zhao, D. et al.; Synthesis of Continuous Mesoporous Silica Thin Films with Three-Dimensional Accessible Pore Structures; Chemical Community, 1998, 2499-2500.

Miley, G. H. et al., Nuclear Transmutations in Thin-Film Nickel Coatings Undergoing Electrolysis; Journal of New Energy, 1996, 1(3): p. 5.

Miley, G. H. et al.; Use of Combined NAA and SIMS Analysis for Impurity Level Isotope Detection; Journal of Radioanalytical and Nuclear Chemistry, vol. 263, No. 3 (2005) 691-696.

Miley, G. H. et al.; Review of Transmutation Reactions in Solids; Tenth International Conference on Cold Fusion, 2003, Cambridge, MA.

Lipson, A. G. et al.; Phenomenon of an Energetic Charged Particle Emission From Hydrogen/Deuterium Loaded Metals; Tenth International Conference on Cold Fusion, 2003; Cambridge, MA.

Ichimaru, Setsuo et al.; Pycnonuclear Reactions in Dense Astrophysical and Fusion Plasmas; Physics of Plasmas, vol. 6, No. 7, Jul. 1999, American Institute of Physics.

Lipson, A. G. et al.; Evidence of Supersoichiometric H/D LENR Active Sites and High Temperature Superconductivity in a Hydrogen-Cycled Pd/PdO; ICCF-12, Yokohama Nov. 27-Dec. 3, 2005.

Atzeni, S. et al.; The Physics of Inertial Fusion; Beam Plasma Interaction, Hydrodynamics, Hot Dense Matter; Clarendon Press—Oxford; 2004.

Miley, G. H. et al.; Intense X-Ray Emission from Pd and Ti Cathodes in Deuterium Glow Discharge; Proceedings of SPIE, vol. 5197, Soft X-Ray Lasers and Applications V.

United States Statutory Invention Registration No. H872 to Hendricks, Published Jan. 1, 1991.

\* cited by examiner

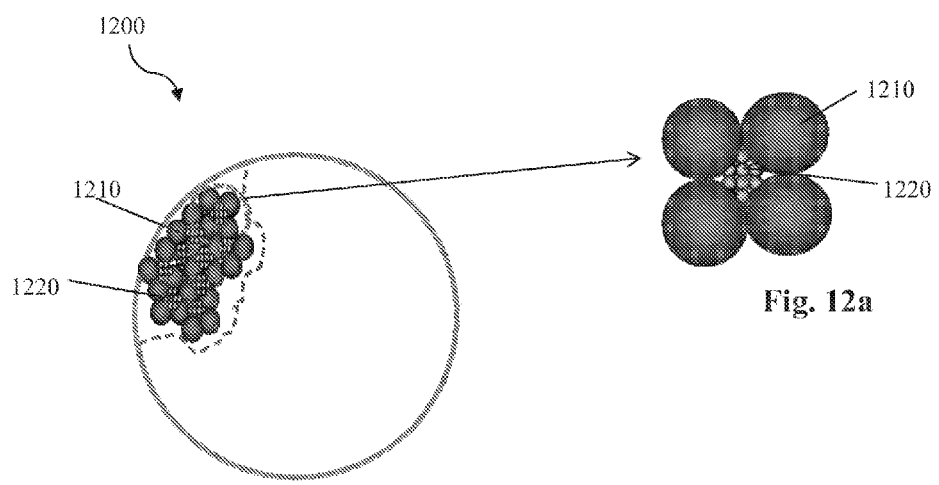
Fig. 12
Fig. 12a
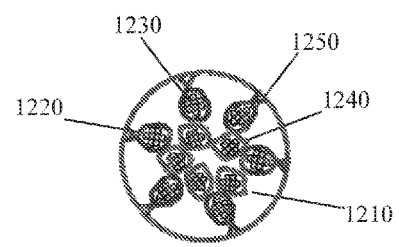
Fig. 12b

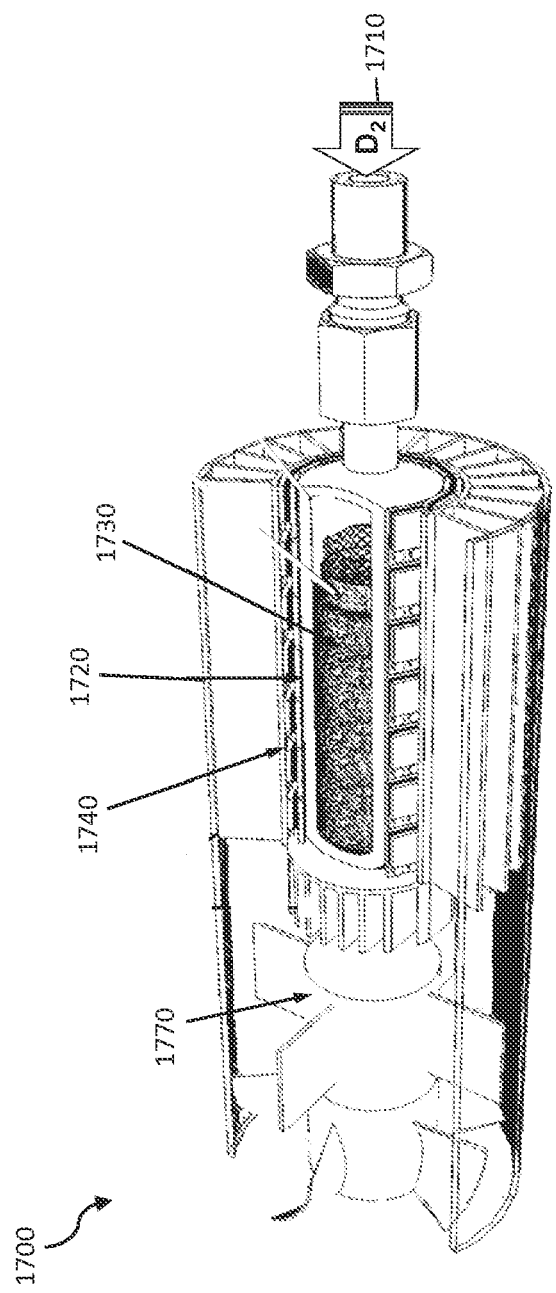

POWER UNITS BASED ON DISLOCATION SITE TECHNIQUES

CROSS-REFERENCE TO RELATED APPLICATIONS

The present application is a continuation-in-part of U.S. patent application Ser. No. 13/414,300 filed Mar. 7, 2012 now U.S. Pat. No. 8,440,165, which is a continuation-in-part of U.S. patent application Ser. No. 12/080,011 filed Mar. 31, 2008, now U.S. Pat. No. 8,227,020, which claims the benefit of U.S. Provisional Patent Application No. 60/920,659 filed Mar. 29, 2007, each of which is hereby incorporated by reference in its entirety.

TECHNICAL FIELD

The present invention generally relates to a gas-loaded reaction system, and more particularly, but not exclusively, to a thermal gas-loaded reaction system powered by a gas-loaded heat generating system.

Present approaches to gas-loaded reaction systems suffer from a variety of drawbacks, limitations, disadvantages and problems including those respecting scalability and others. There is a need for the unique and inventive thermal gas-loaded reaction apparatuses, systems and methods disclosed herein.

SUMMARY

One embodiment of the present invention is a unique thermal gas-loaded reaction system. Other embodiments include apparatuses, systems, devices, hardware, methods, and combinations for gas-loaded reaction systems. Further embodiments, forms, features, aspects, benefits, and advantages of the present application shall become apparent from the description and figures provided herewith.

BRIEF DESCRIPTION OF THE FIGURES

FIG. 12 is a cross section of a packed bed of nanoparticles.

FIG. 12a is a cross section of a gas cluster formed in a void between nanoparticles in FIG. 12.

FIG. 12b illustrates a gas cluster formed in nanoscale pores and voids formed in an individual nanoparticle.

FIG. 17 is a schematic of a gas-loaded reaction generator module.

DETAILED DESCRIPTION OF THE ILLUSTRATIVE EMBODIMENTS

Figure 1:
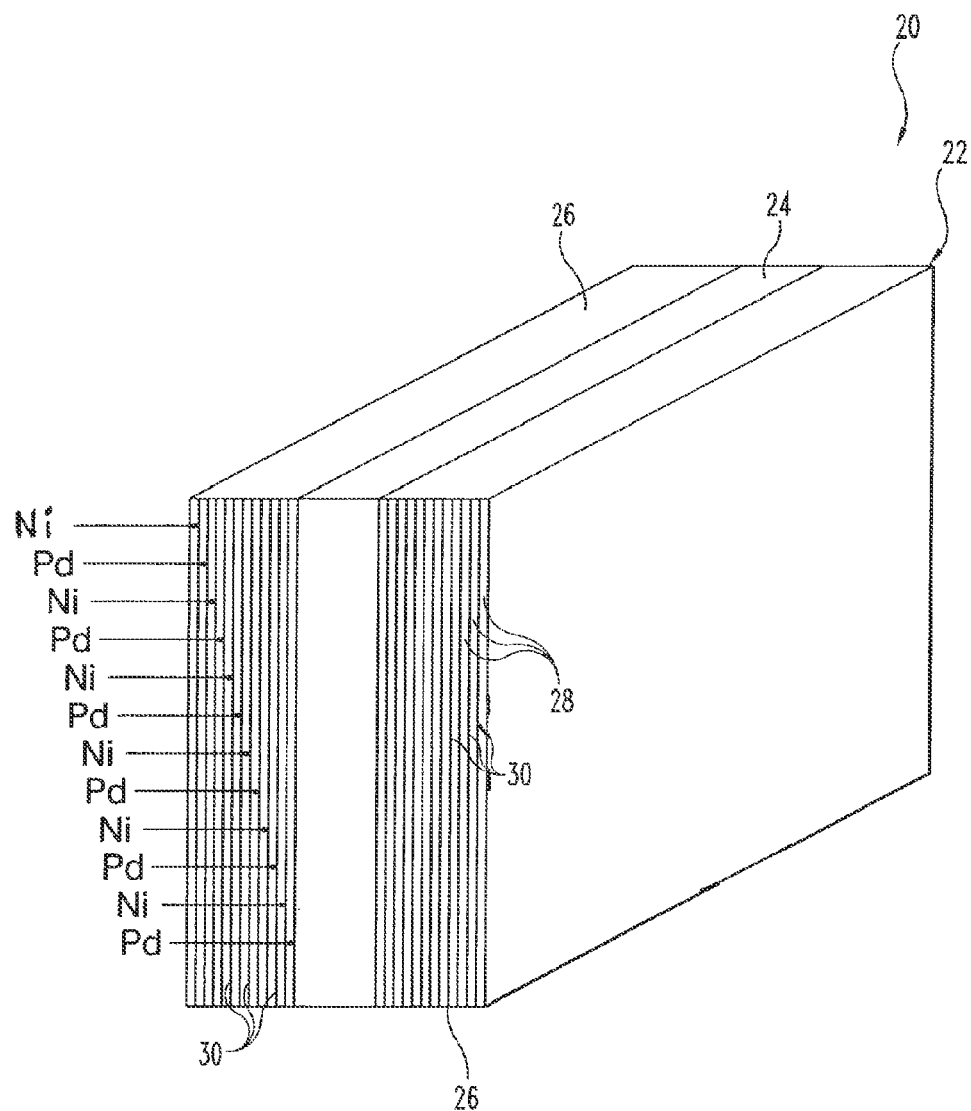
FIG. 1 is a partial schematic view of a multilayer thin film structure.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

One embodiment of the present application is a gas-loaded reaction system including a gas-loaded reaction generator, a thermal transducer, and a heat transfer device. The gas-loaded reaction generator is capable of producing thermal energy and has a gas source of one or more isotopes of hydrogen, a plurality of metallic micro-structures, a gas loading chamber containing the plurality of metallic micro-structures, and a gas loading system. The gas loading chamber is structured to receive the one or more isotopes of hydrogen from the gas source. The gas loading system is capable of providing a gas loading pressure to the gas loading chamber containing the plurality of metallic micro-structures with an amount of one or more isotopes of hydrogen to form hydrogen clusters.

As indicated above, the gas-loaded reaction generator includes a plurality of metallic micro-structures. In one embodiment, the metallic microstructures include thin-films. In another embodiment, the metallic microstructures include nanoparticles.

One embodiment of the present application relates to generation of a high density of clusters of one or more isotopes of hydrogen. In one form, these clusters form in voids between a bed of packed nanoparticles and at interfaces of multi-layer thin film structures. In another form, the clusters form along the surfaces of nanoparticle structures. In one example of the multilayer structure, stress-created dislocation defects suitable for the formation of such clusters are created at the interfaces between thin films by cyclic loading and deloading of hydrogen.

Loading can refer to adsorption of hydrogen and hydrogen isotope gases into the lattice structure of the metal films or the interstitial spacing of the nanoparticles. This loading includes adsorption into the volume of the metal lattice or into the local formation of clusters. Deloading refers to the reverse process.

Alternatively or additionally, further forms employ placement of nanoscale particles or fibers between the interfaces to cause suitable void sites during manufacture of the films. Other embodiments include configurations of the structures for use in superconductors, charged particle and/or x-ray sources, and/or for use in power systems.

A further embodiment is illustrated as multilayer thin film device 20 in FIG. 1. Device 20 includes two multilayer thin film stacks 26 on opposite sides of base/substrate 24. Each stack 26 includes alternating inner layers 28 of different types of metals designated as palladium (Pd) and nickel (Ni), respectively. Between each inner layer 28 of Pd and Ni, a Pd/Ni interface 30 is formed, only a few of which are specifically designated to preserve clarity. In one form, the base 24 is fabricated from stainless steel or aluminum; however, other materials may be used in different embodiments.

In one alternative embodiment, the alternating inner layers 28 are of two dissimilar metallic materials. In a further embodiment, the alternating layers 28 are a metal and an oxide of metal, such as alternating inner layers of Pd and PdO. In another form, one layer 28 for each interface 30 is comprised of a material that readily forms a hydride and the other layer 28 for such interface 30 is comprised of material in which isotopes of hydrogen are readily accepted. By way of non-limiting example, Pd and Ti readily form hydrides and Ni readily accepts hydrogen loading. In still another form, one of the alternating inner layers 28 includes one element selected from a group consisting of Pd, Ti, Ni, Li, Au, Ag, U, and alloys thereof, and the other of the alternating inner layers 28 includes a different one of this group. This form is intended to include alternating layers each comprised of a different alloy of Pd, Ti, Ni, Li, Au, Ag, and/or U.

Figure 1A:
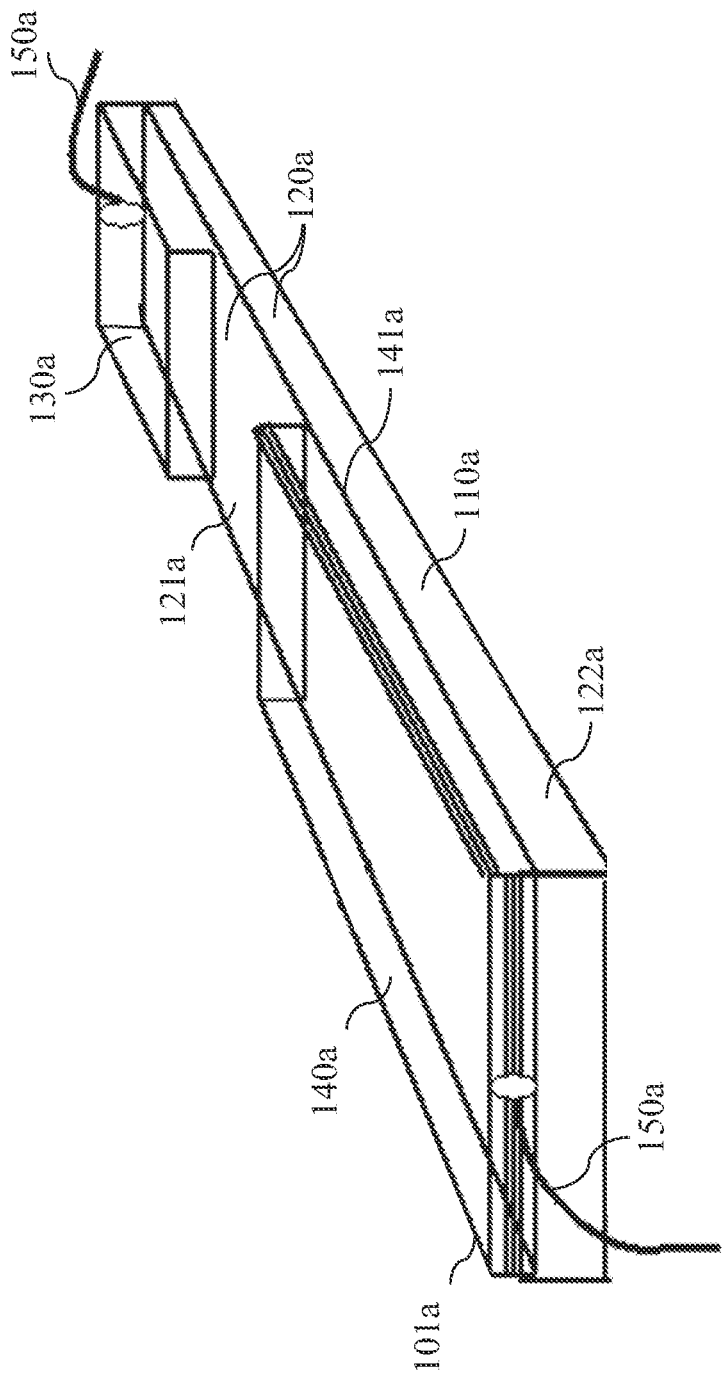
FIG. 1a is a unique integrated thin film plate type electrode.

For embodiments utilizing a continuous reaction, a 'flux' of ions diffusing through the multilayer structure may be maintained. One embodiment is designed for hydrogen isotopes in an electrolysis unit to accomplish this as shown in FIG. 1a. In this embodiment a multilayer type structure of FIG. 1 is located on a non-electrical conducting substrate 110a such as but not limited to quartz. The layer structure is shown coated with a diffusion barrier 120a such as chromium, for example, on a top surface 121a and a side surface 122a. An electrical connection 150a from the electrodes is connected to an electrolysis power supply such that an electronic field is created from an anode 130a to a cathode 140a parallel to substrate 110a. The well-known electromigration effect forces the hydrogen isotopes to enter and transport through cathode 140a of thin film 101a parallel to substrate 110a. Film interfaces provide volumetric loading and local cluster formations due to the corresponding ion hydrogen formation and a continuous ion flux in the same direction. The degree of loading and the numbers of clusters can be controlled by constructing the area of the exit region smaller than the entrance region by partially covering the exit surface with diffusion barrier 120a such as used on the top and sides of the multi-layer structure. Formation of a smaller area section for exiting hydrogen isotopes reduces the exit flow causing a build-up in density of isotopes in this region which in turn results in the higher loading there.

Figure 1B:
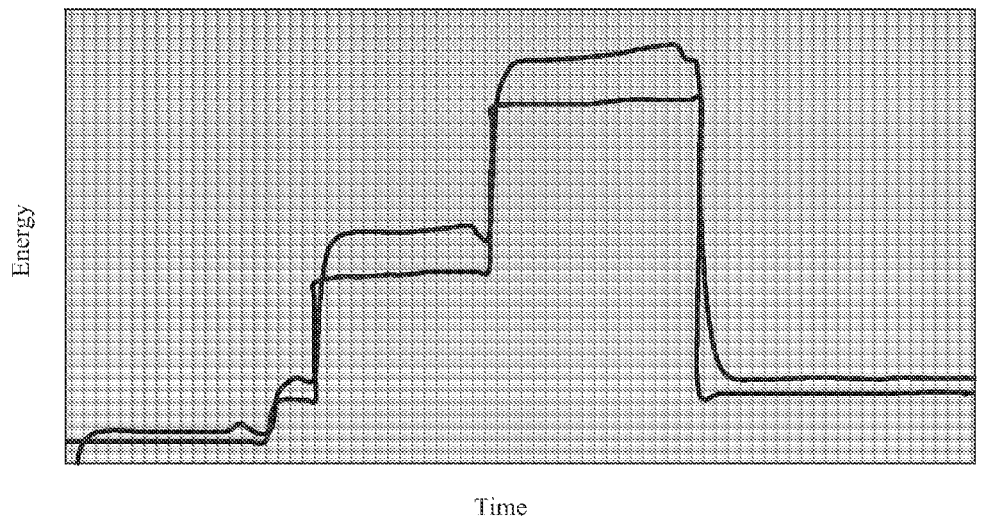
FIG. 1b is a graphical representation of a heat measurement for a two layer electrode of Palladium and Nickel thin film on alumina.

This embodiment of creating an ion flux also allows an increase (or decrease) in reaction rates in the multilayer electrode. One specific embodiment includes pulsing an applied voltage between a set of electrodes by an external power supply. The resulting change in the induced electrical field created parallel to a substrate in turn changes the ion flux driven by electromigration. The effect of stepping the voltage up and down and the corresponding change in reaction rate, and hence power output of the electrolysis cell placed in a calorimeter, is illustrated in FIG. 1b. After each rapid increase (or decrease) in voltage, the percentage of power increase above that caused by the electrified input for electrolysis increases (or decreases), which indicates a corresponding change in reaction rate. Other embodiments such as but not limited to the application of laser light, ultrasound, radiofrequency waves, etc., may be used to change the ion diffusion rate or flux. These embodiments may then serve as a method to adjust or control reaction rates in electrolytic apparatus employing multilayer thin film electrodes.

Figure 1C:
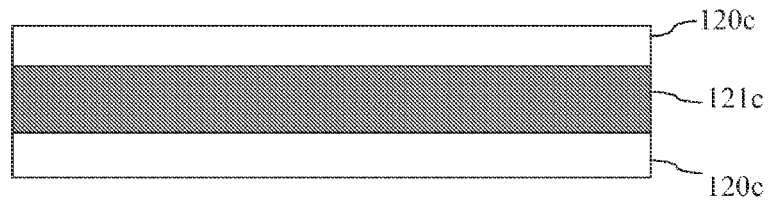
FIG. 1c is an illustration of PdO—Pd—PdO type electrode.

In yet another embodiment illustrated in FIG. 1c, a thin Pd film 121c or layer is formed between PdO layers 120c formed by heating the Pd surface in an oxygen environment. This embodiment represents a three layer configuration, the central layer 121c being unconverted Pd. For some applications, a supporting substrate could substitute for the lower PdO film. This embodiment is particularly useful in situations where electron, ion, or laser light is directed at the Pd-based object after loading with a hydrogen isotope and clusters formed by the loading-deloading technique described herein. In one such embodiment, irradiation with a pulsed Petawatt laser drives the hydrogen isotope ions out of the cluster filled film forming energetic particle beams.

Figure 2:
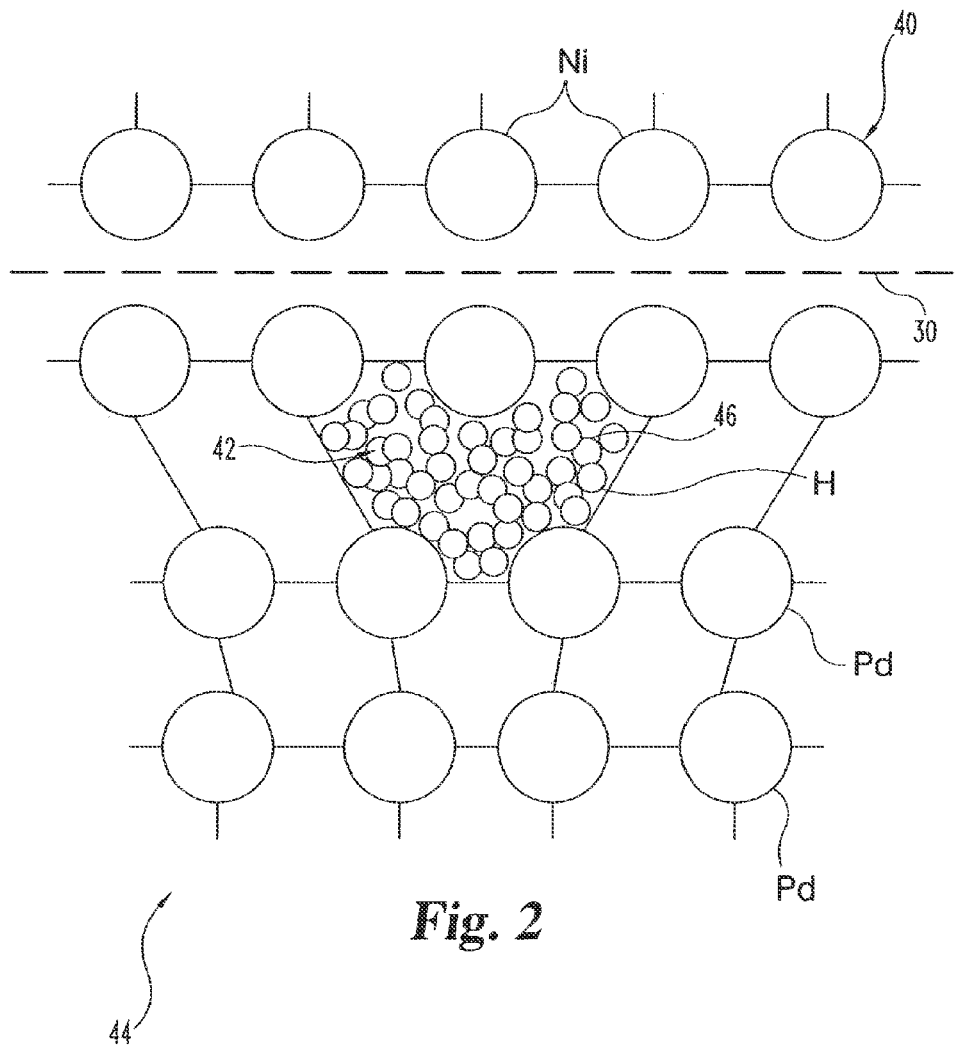
FIG. 2 is a schematic view of a dislocation core formed in a lattice of the device of FIG. 1.

Referring to FIG. 2, schematically shown is an atomic lattice 40 with a representative dislocation core 42 formed along interface 30 in a portion 44 of two internal layers 28 of device 20 in FIG. 1 (not to scale). A number of hydrogen atoms comprise cluster 46 in core 42, which may be comprised of one or more hydrogen isotopes ($^1$H, $^2$H or D (deuterium), $^3$H or T (tritium)). In one form, dislocation core 42 is structured to receive a cluster 46 of at least 5 hydrogen atoms or isotopes thereof. In a more preferred form, dislocation core 42 is structured to receive a cluster 46 of at least 50 hydrogen atoms or isotopes thereof. In an even more preferred form, the dislocation core 42 is structured to receive a cluster 46 of at least 500 hydrogen atoms or isotopes thereof.

Figure 3:
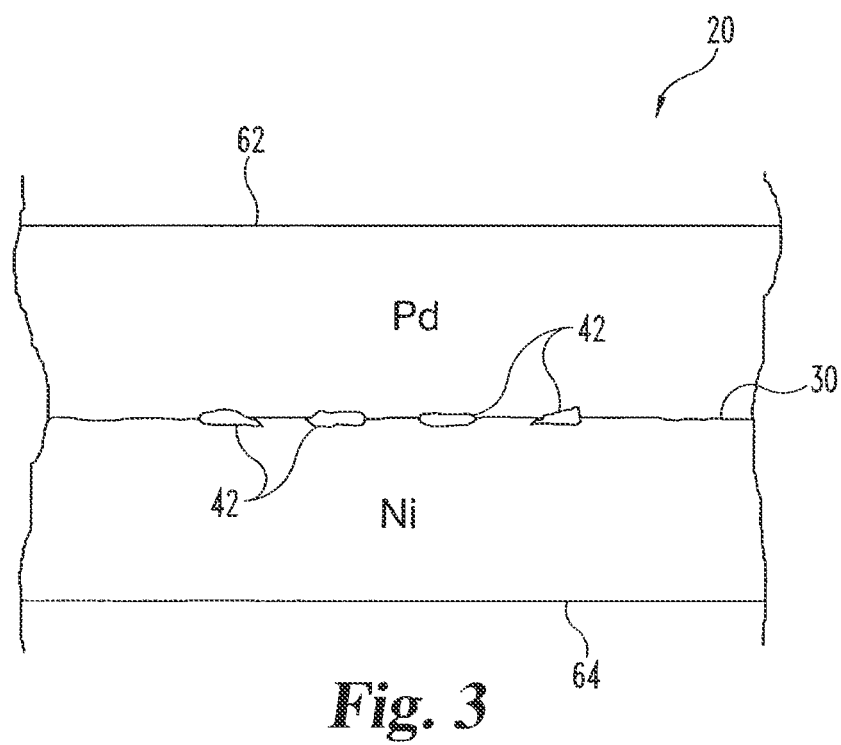
FIG. 3 is a schematic partial view of an interface between layers of the FIG. 1 device along which dislocation cores have been formed.

Referring additionally to FIG. 3, a number of dislocation cores 42 are shown schematically along interface 30 formed between inner layer 28 of Pd and inner layer 28 of Ni for device 20. In FIG. 3, the Pd layer is more specifically designated by reference numeral 62 and the Ni layer is more specifically designated by reference numeral 64. It should be understood that the nature of Pd as a more favorable hydride forming substance than Ni likely results in the formation of dislocation cores 42 in layer 62 at interface 30. The dislocation cores 42 contain mismatched atomic structures due to the different materials on each side of the interface 30—making it susceptible to stress-created dislocations, such that a large density of dislocation sites for cluster formation can be obtained with some degree of uniformity along the surface area of interface 30. The use of multiple thin film layers with many interfaces 30 approximates a nearly uniform three-dimensional volume for dislocation (and correspondingly cluster) sites to form.

In one embodiment, a technique to increase formation of dislocation cores involves preparing the thin film layer interface 30 using one or more different procedures. In one non-limiting form, a predefined target representative of a desired dislocation site density of a multilayer thin film device design is established, and a multilayer thin film device is formed according to the design. This device formation includes providing a first layer of a first type of material and a second layer of a second type of material dissimilar from the first type of material and preparing an interface between the first layer and the second layer to increase a quantity of dislocation sites there along in correspondence with the predefined target. After forming, the multilayer thin film device is supplied with one or more isotopes of hydrogen to form hydrogen clusters in the dislocation sites to facilitate application as a superconductor, an X-ray source, a charged-particle source, as a power supply component, or the like.

Figure 16:
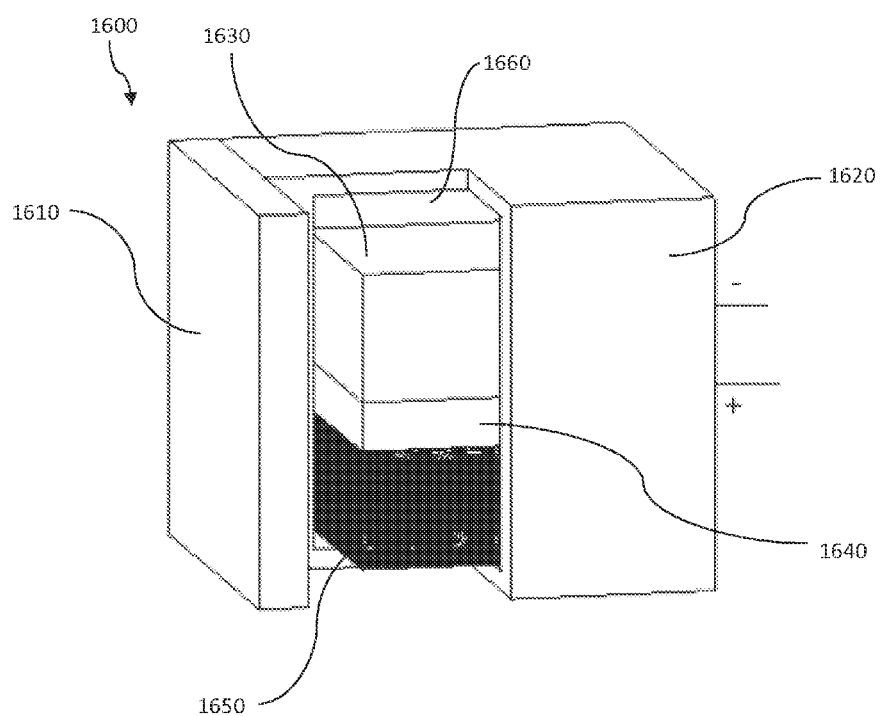
FIG. 16 is a schematic of a small power unit with a gas-loaded reaction generator.

Gas-loading reaction systems can include stand-alone reaction systems ranging from a small battery size to a large central plant. Reaction systems can also include distributed energy systems and co-generation systems. In one embodiment, a gas-loaded reaction system 1600 as shown in FIG. 16 includes a gas source 1610 and an enclosure 1620. Inside the enclosure 1620 is a gas-loaded reaction generator with a metallic microstructure 1630 where the metallic microstructure is exposed to a gas from the gas source 1610 and in communication with a thermal transducer 1640. A heat sink 1650 and insulation 1660 can be included to manage thermal migration from the metallic microstructure 1630 through the thermal transducer 1640. For a thermal transducer in the form of a thermoelectric generator and a metallic microstructure in the form of thin-films, the gas-loaded reaction system can have a size approximate an alkaline battery.

Figure 4:
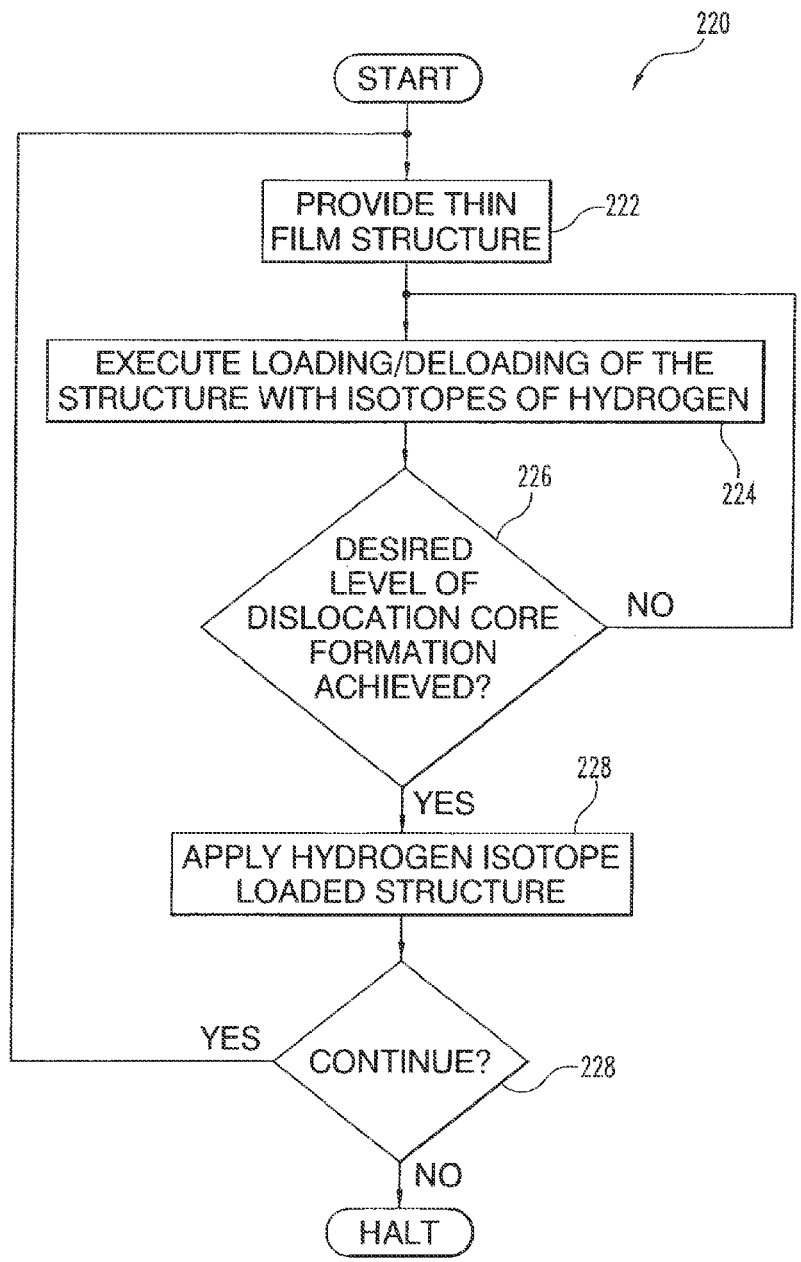
FIG. 4 is a flow chart describing one procedure for forming dislocation cores along the interface illustrated in FIG. 3.

FIG. 4 provides a flowchart of one non-limiting procedure 220 of the present application to promote dislocation core formation. Procedure 220 begins with providing a thin film structure, such as device 20 in operation 222. Procedure 220 continues with operation 224 in which the thin film structure is loaded with one or more isotopes of hydrogen using any of several techniques. These techniques include: electrolysis hydrogen loading, pulsed plasma bombardment hydrogen loading, and gas pressure hydrogen loading. During loading, the metal lattice is expanded by the entering hydrogen atoms, creating stress which causes dislocation core formation. In one implementation, loading occurs at several atmospheres for several hours. After loading, the structure is deloaded in operation 224. Deloading of the loaded hydrogen allows repetition of the loading stresses and progressively forms added dislocation cores. In some embodiments, the deloading process may include features such as heating the system to several hundred degrees C. for times up to 2-3 hrs to remove volumetric hydrogen. In other embodiments, a deloading process may not include such features when clusters operate at >600° C.

Figure 4A:
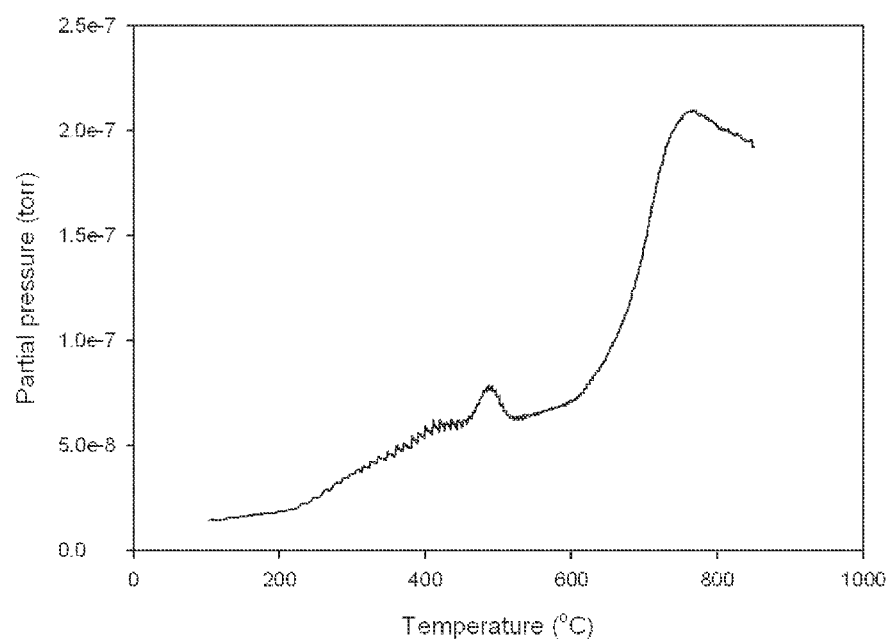
FIG. 4a is a graphical representation of temperature programmed desorption measurements of a cluster loaded electrode shown in FIG. 1c.

In one non-limiting form, deloading occurs for about two hours by pumping a chamber containing the structure down to hard vacuum. The relative volumetric loading and cluster loading can be tested using a vacuum oven which can slowly heat a sample film up to high temperatures. Illustrated in FIG. 4a, as the sample film heats up in the vacuum oven, the hydrogen gas pressure in the oven chamber increases (measured with a gas analyzer to eliminate contaminate gas such as but not limited nitrogen, oxygen, etc., from adding to the pressure recorded). The initial build up comes from volumetric hydrogen but at higher temperatures (around 450 and 800° C.) peaks in pressure occur due to a release of the more tightly bound hydrogen (or deuterium) clusters. Two peaks are observed in the data shown in FIG. 4a and can be attributed to smaller less dense more weakly bound clusters followed by the larger peak attributed to the more strongly bound, more dense cluster hydrogen in an ultra dense cluster.

From the loading/deloading of operation 224, procedure 220 continues with conditional 226. Conditional 226 tests whether a desired level of dislocation core formation has taken place. If the test outcome is false (no), then the loading/deloading cycle of operation 224 is repeated until the test is true (yes). The cycle may be repeated for several days up to a week or more, and such cycles may be timed and or with other salient parameters that are uniform/periodic from one to the next or non-uniform/aperiodic in nature. In one form, at least 5 cycles are performed. In a more preferred form, at least 10 cycles are preformed. In some cases it may be necessary to perform at least 25 cycles.

Returning to FIG. 4, the test may be satisfied simply when a predetermined number of loading/deloading cycles of operation 224 are completed. Alternatively or additionally, the test of conditional 226 may be satisfied by direct observation and/or by indirect measurement. In one example, the test is satisfied by gas pressure measurements to determine flows in and out of the sample during loading and deloading. The process is continued until these pressure measurements indicate that a saturation amount of retained gas is achieved, i.e. a maximum number of target dislocation site/clusters has been formed. From conditional 226, procedure 220 continues with operation 228. In operation 228, hydrogen is supplied to the structure to provide clustering in the dislocation cores formed by the repetitive loading/deloading cycles and applied as desired as a superconductor device or cable, an X-ray source, a charged particle source, as a power supply component, or the like. In another embodiment, volumetric loading may be selectively removed (leaving only hydrogen in cluster sites) by low temperature (≲300° C.) desorption as was done in the cycles of 224. Following such a procedure, operation 228 may incorporate a hydrogen isotope loaded structure with multiple plates into a cell. Such a cell may involve creation of a superconductor device or cable, an X-ray source, a charged particle source, as a power supply component, or the like. Depending on the application, a continuous flow of one or more hydrogen isotopes may be provided in operation 228 and/or an intermittent supply provided.

Figure 5:
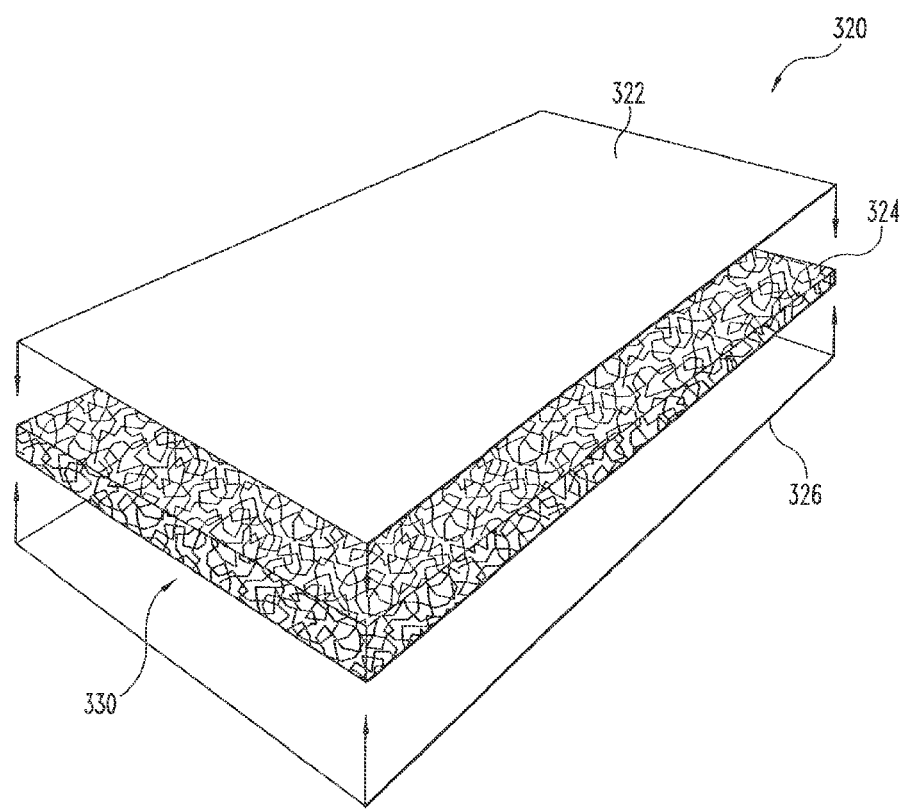
FIG. 5 is a partial schematic view of a multilayer thin film device including a void-inducing material structured to form dislocation cores along an interface between different layers.

A further procedure for forming dislocation sites at the thin film interfaces involves placing microscale and/or nanoscale material between the layers. This material is in the form of particles, wires, fibers, meshes, a porous film/layer, or a combination of these. FIG. 5 schematically illustrates thin film device 320. Device 320 includes thin film layer 322 and thin film layer 326 with a dislocation site-inducing structure 324 positioned there along the resulting thin film layer interface 330. Structure 324 can be a microscale and/or nanoscale material that causes voids and discontinuities to form along the interface in the nanoscale range. It should be appreciated that microscale materials frequently are structured to form nanoscale voids between its constituents and/or with one or more of layers 324 and 326, from which dislocation cores result. Specifically, the thickness of the structure involved is desirably selected to obtain the dislocation site density. Generally, dislocation sites form around the intersections of the microscale/nanoscale structures where a higher density of void spaces can occur between layers. Note that with preformed nanoscale voids in the structure 324, loading without cycling can achieve a higher dislocation site density and corresponding hydrogen isotope cluster density.

Figure 6:
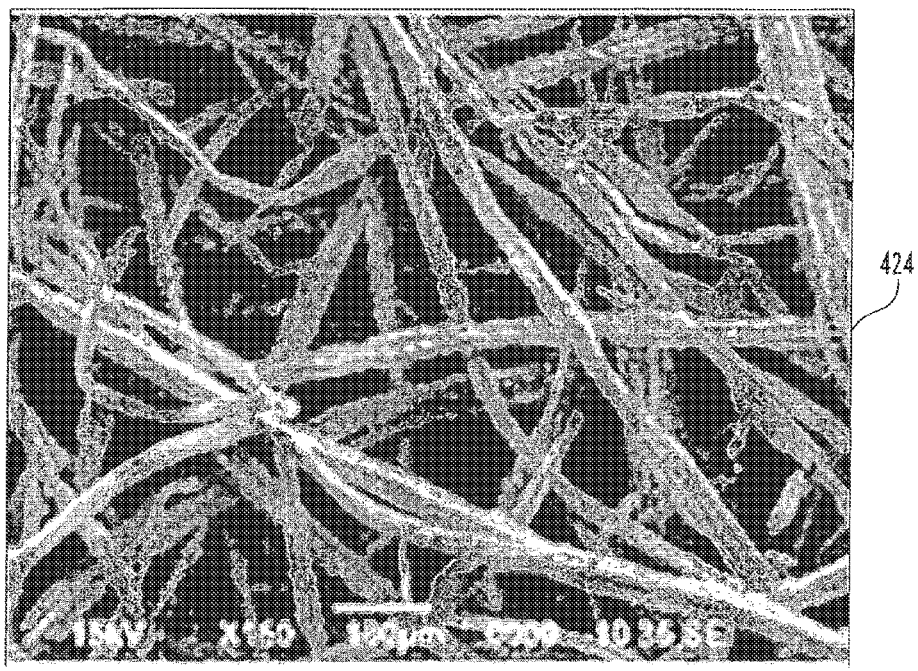
FIG. 6 is a computer-generated image of a micro-nickel mesh utilized as the void-inducing material for the device of FIG. 5.

FIG. 6 illustrates a computer-generated image of a micronickel fiber (MNF) mesh 424. Mesh 424 is one non-limiting form of structure 324. Mesh 424 has dimensions in the microscale range as can be observed in the image of FIG. 7, which includes a reference distance of 100 micrometers (100 μm) in the bottom center portion. In one process that used MNF, a Pd film is sputtered onto a ceramic substrate, and the MNF is then placed on top of the Pd film. This arrangement is then heated and maintained at several hundred degrees C. in a vacuum chamber for ~2 hours for out-gassing and annealing. Next, a second thin film is sputtered onto the top of the MNF. The process is then repeated to build-up the desired layering for the multilayer device.

Figure 7:
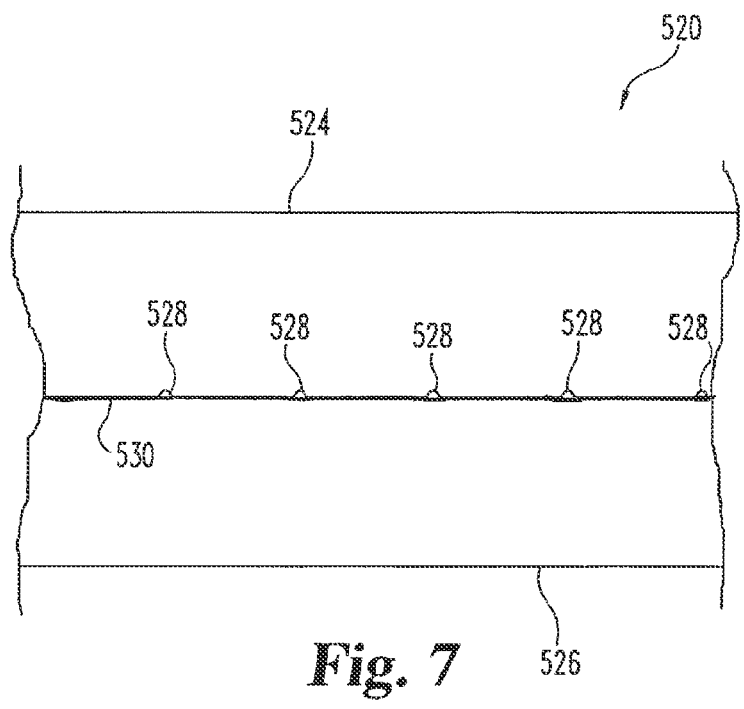
FIG. 7 is a schematic view of a multilayer thin film device including channels formed in one of the layers along the interface between the layers to form dislocation cores.

FIG. 7 illustrates multilayer thin film device 520 that incorporates another technique to provide for the formation of nanoscale voids that induce dislocation site formation. Device 520 is partially shown, including thin film layer 524 and thin film layer 526 that form interface 530 there. Along interface 530, a number of microscale and/or or nanoscale channels 528 are formed in the face of layer 524 to provide for the formation of dislocation sites. In one form, micro-grooving is used to create a "scratch" pattern on the thin-film prior to deposition of the subsequent layer. While sputtering was used in these preparations, in other embodiments alternate techniques can be used, such as plasma deposition, electroplating could be used, chemical vapor deposition, and/or or physical vapor deposition could be used.

While only shown with two layers, it should be understood that device 320 or 520 can each include a greater number of alternating thin film layers to provide a number of interfaces 330 or 530 between each alternating layer pair. It should be appreciated that the alternate layer compositions described in connection with device 20 can also be utilized with device 320 and/or device 520. Likewise, it should be appreciated that any of the dislocation core formation techniques (and correspondingly the cluster formation techniques) described with any embodiment of these devices can be used in combination or as alternatives to one another in other embodiments. It should be understood that when multilayers are used, the unused unreactive material interface can be minimized to increase the volume percentage occupied by voids and/or dislocations where clusters are formed.

Figure 8:
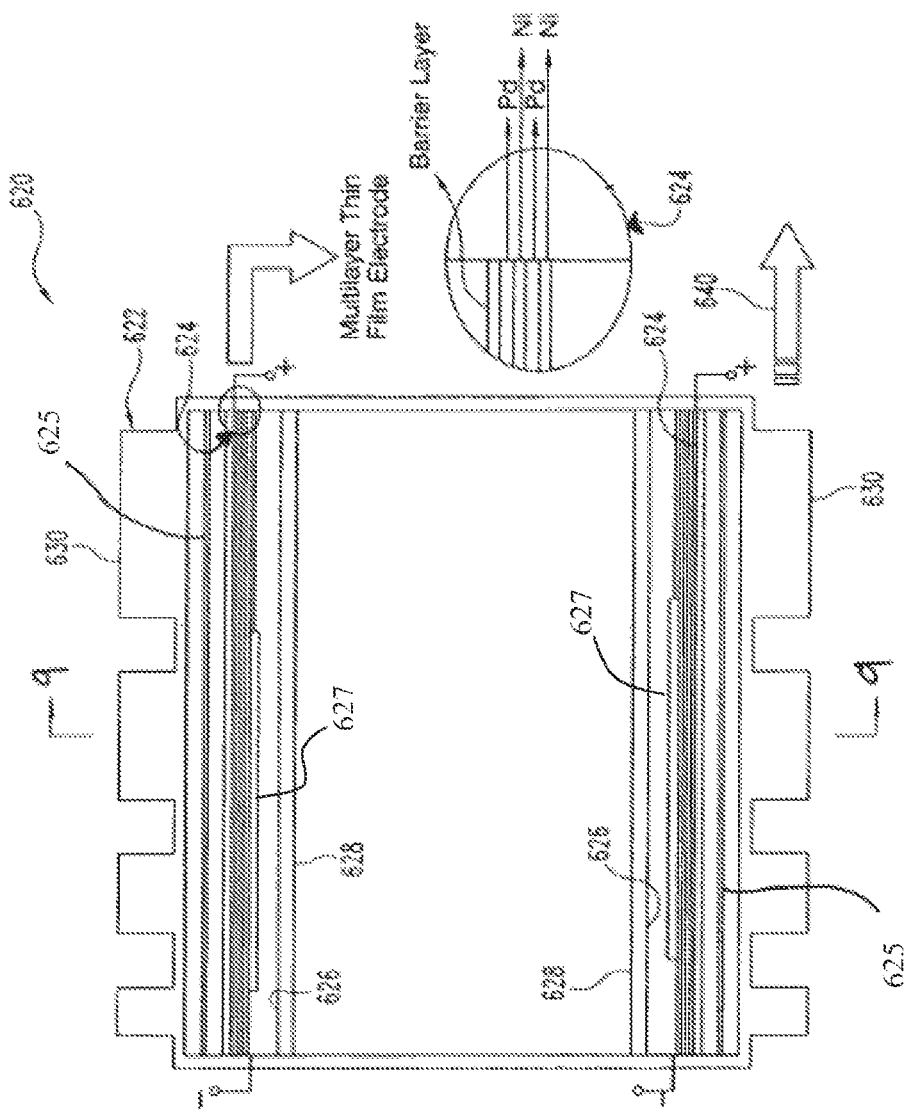
FIG. 8 is a partial schematic sectional view of a device for a power system incorporating a multilayer thin film electrode.
Figure 9:
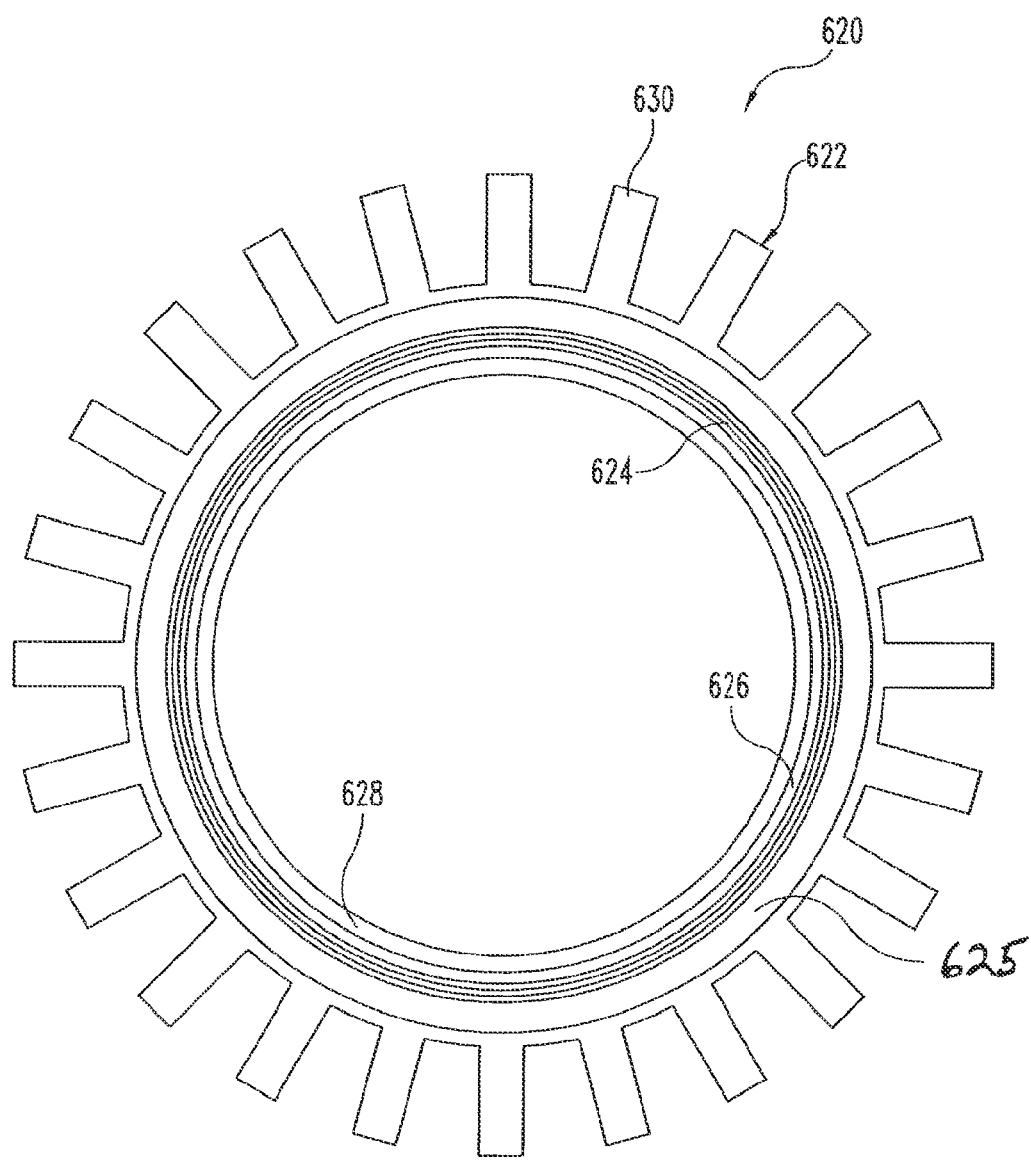
FIG. 9 is a further view of the device taken along section line 9-9 in FIG. 8.

A number of different implementations of the thin film structures of the present application are envisioned. For instance, FIGS. 8 and 9 depict a hydride-loaded, thin-film multilayer electrode power system 620. FIG. 9 is taken along section line 9-9 of FIG. 8, illustrating an approximately cylindrical profile. System 620 includes a multilayer thin film electrode structure 624 inside a cylindrical housing 622. Structure 624 includes alternating inner layers of Pd and Ni, with an outer barrier layer of a non-diffusing material such as chromium or platinum and an inner platinum (Pt) block 627 covering the inner portion of the thin films. Inner Pt block 627 may be situated such that diffusing hydrogen isotope ions enter the larger portion of the uncovered thin film layers, diffuse parallel to the films and exit on the smaller uncovered portion of the thin films. This configuration is equivalent to the design shown in FIG. 1a.

Inside structure 624 is a hydride donor layer 626 structured to donate protons, such as (LaNiH$_x$) for cluster formation in dislocation sites of structure 624. Inside layer 626 is a semi-transparent oxide layer 628. A standard-type thermoelectric converter layer 625 is included outside of structure 624 to convert thermal energy from the electrode to electrical energy. Radial fins 630 provide for thermal dissipation in concert with coolant flow (such as ambient air) represented by arrow 640. U.S. Pat. No. 7,244,887 (issued Jul. 17, 2007) provides additional background information regarding this type of power system arrangement, and is hereby incorporated by reference.

The Pd and Ni films of structure 624 are prepared on a cylindrically shaped Pt substrate block using one or more of the techniques to prepare enhanced dislocation site density and corresponding cluster formation, as described in connection with FIGS. 1-7. Structure 624 could use different thin film compositions, layer quantities, and the like of any of the embodiments previously described in connection with FIGS. 1-7.

In another embodiment, a gas-loaded reaction system 1700 as shown in FIG. 17 includes a gas source 1710 in communication with a generator housing 1720. The generator housing 1710 can include a cylinder shaped thermal transducer 1740 filled with a core of nanoparticles 1730. In one embodiment, the nanoparticles can include a metallic material. The metallic material can include, for example, at least one of palladium, nickel and zirconium. In a further embodiment, the zirconium can be in the form of zirconium oxide. In response to an introduction of gas to the particles within the generator housing, the resulting thermal energy can be converted by the thermal transducer to electrical energy. The electrical energy can then be supplied to a motor 1770 or other electrical load.

Another application of any of these embodiments is to provide superconducting structures. Such structures could be in the form of thin plates or in the form of wires. In one non-limiting superconductor implementation, thin film structure geometry is selected to form dislocation cores that provide a corresponding hydrogen cluster density with a large cross sectional area. As previously described, still other embodiments utilize the inventive aspects of the present application to prepare multilayer thin film structures for X-ray and/or high energy (MeV) charged particle sources. Emission of both energy forms has been observed for Ni/Pd thin-film structures, but other combinations of materials may be selected.

The principles described here for plate type thin film can be extended to other geometries, such as rods or spheres. The geometry employment is often driven by the intended application. For example, in a particular embodiment, hydrogen isotope storage could use plate geometry; in another embodiment, hydrogen isotope storage for a superconductive "cable" could use rods. Another specific embodiment includes internal confinement fusion (ICF) which can use a spherical arrangement.

Figure 10:
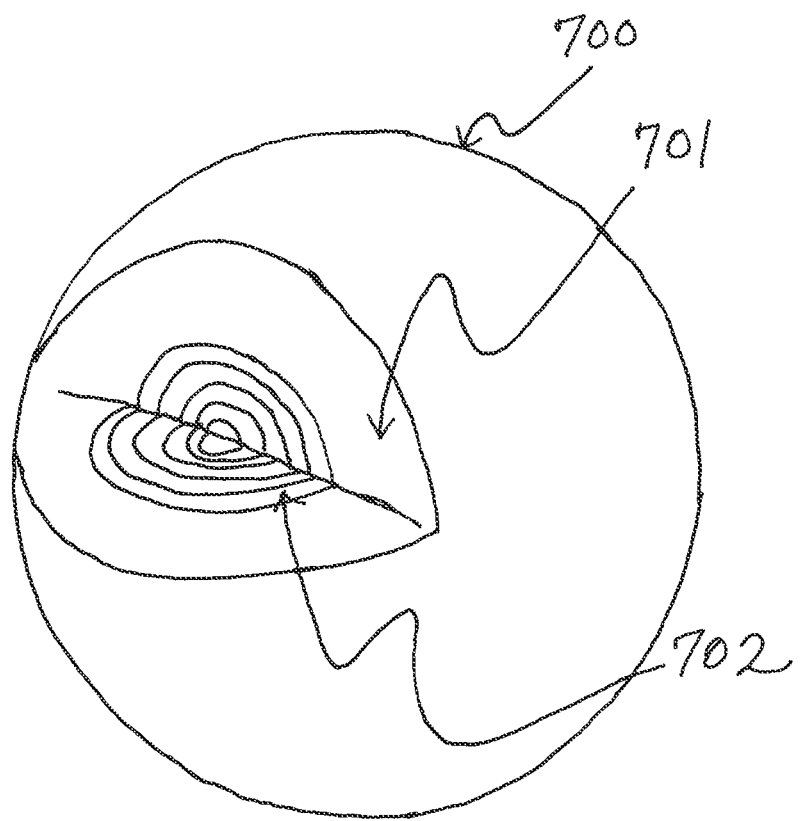
FIG. 10 is a partial schematic view of a multilayer thin film device structured as an inertial confinement fusion target.
Figure 10A:
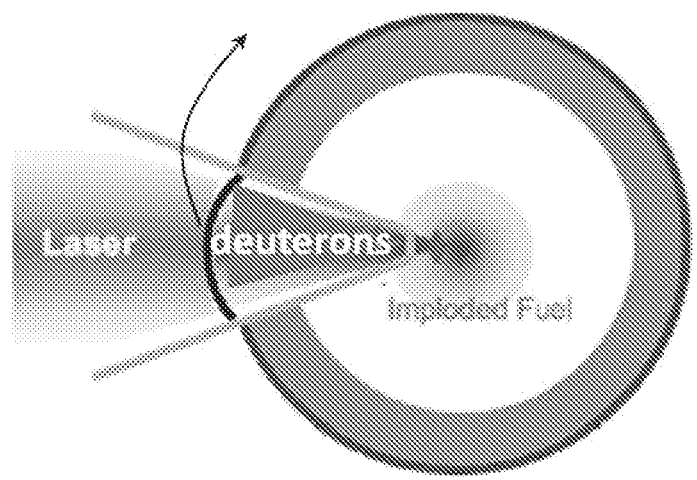
FIG. 10a is a schematic view of Petawatt laser irradiation of a cluster-containing converter foil to direct MeV proton or deuteron beams from the clusters onto an inertial confinement fusion target.

FIG. 10 depicts a small spherical inertial confinement fusion target 700 of yet a further embodiment of the present application in a partial schematic, cutaway form. In one non-limiting form, target 700 is an approximately spherical, ultra-high density inertial confinement fusion fuel (ICF) target and is provided in the micron to millimeter size range. A conventional ablator-tamper 701 (such as described in S. Atzeni and T. Meyer-TerVehn, *The Physics of Inertial Fusion*, Oxford University Press, 2004, which is hereby incorporated by reference), surrounds a multi-layer device 702. Device 702 includes alternating layers of different materials with interfaces suitably forming a region of dislocation cores prepared according to one or more of the previously described embodiments of the present application. Low atomic number Z material selection, such as but not limited to Beryllium and Lithium is preferred to avoid excessive Bremsstrahlung emission during laser interaction and compression. The dislocation cores of this region are loaded with hydrogen isotopes such as deuterium and/or tritium. When exposed to a pulsed laser beam or ion beam of sufficient intensity (such as available at the ICF facility at the Lawrence Livermore National Laboratory (USA)), ablation of the ablation-tamper 701 material results in compression of the core region 702—such compression may be by a factor of 100 to 1000 in terms of volume. Because the hydrogen isotope clusters in dislocation sites start at densities typically well above that of gaseous or cryogenic deuterium-tritium generally employed, the compressed density of the isotopes in the clusters will be correspondingly higher, which in turn can result in higher fusion rates (proportional to the square of the isotope density) and an increased burn-up fraction (fraction of the original isotope burned in the imploded target). This improved performance is of interest for fusion power studies and applications thereof (such as power systems), particle/radiation generation, and the like. Additionally or alternatively, target 700 can be adapted to other types of targets currently employed in ICF studies such as indirect-drive holrahm targets as further described by Atzeni and Meyer-TerVehn in *The Physics of Inertial Fusion*, Oxford University Press, 2004, (previously incorporated by reference).

Another embodiment for an ICF application is termed "fast ignition," which uses Petawatt laser interaction with a deuterium cluster thin-film focus to produce MeV deuterium ion beams focused on an ICF spherical target in order to provide the ignition of the target burn. The use of pulses of MeV ions such as protons, deuterons, or others such as carbon has been studied at various DOE laboratories such as Los Alamos National Laboratory (LANL). Preliminary experiments with a cluster target at LANL have established beam formation from a cluster thin-film using a Petawatt laser. One feature includes a low "contrast ratio," i.e., ratio of laser light intensity on the film just prior to actual achievement of the peak pulse intensity. While other deuterium containing films can be used, the cluster film offers improved features such as substantially continuous availability of deuterium through the length of the laser pulse, better laser energy utilization as the metal host material is much heavier than deuterium, and thus has little acceleration and low sharing of laser energy with deuterium.

A further embodiment of the present application relates to the formation of a high density of one or more isotopes of hydrogen at surface interfaces of nanoparticle structures. In a specific embodiment, the previously discussed effect of forming layer "dislocations" may be provided by the interstitial spacing of nanoparticles. The nanoparticles may create interstitial trapping zones for the hydrogen ions with nanoparticle surface topography and roughness, plus voids formed in a packed bed of nanoparticles. In another embodiment, surface adsorption may trap hydrogen or one of its isotopes such as but not limited to deuterium on the surfaces. The hydrogen isotope may be is dissociated. After which the hydrogen isotope may diffuse into the inner lattice of the nanoparticles and form volumetric loading with high density localized clusters (such as described for thin films earlier).

Figure 11:
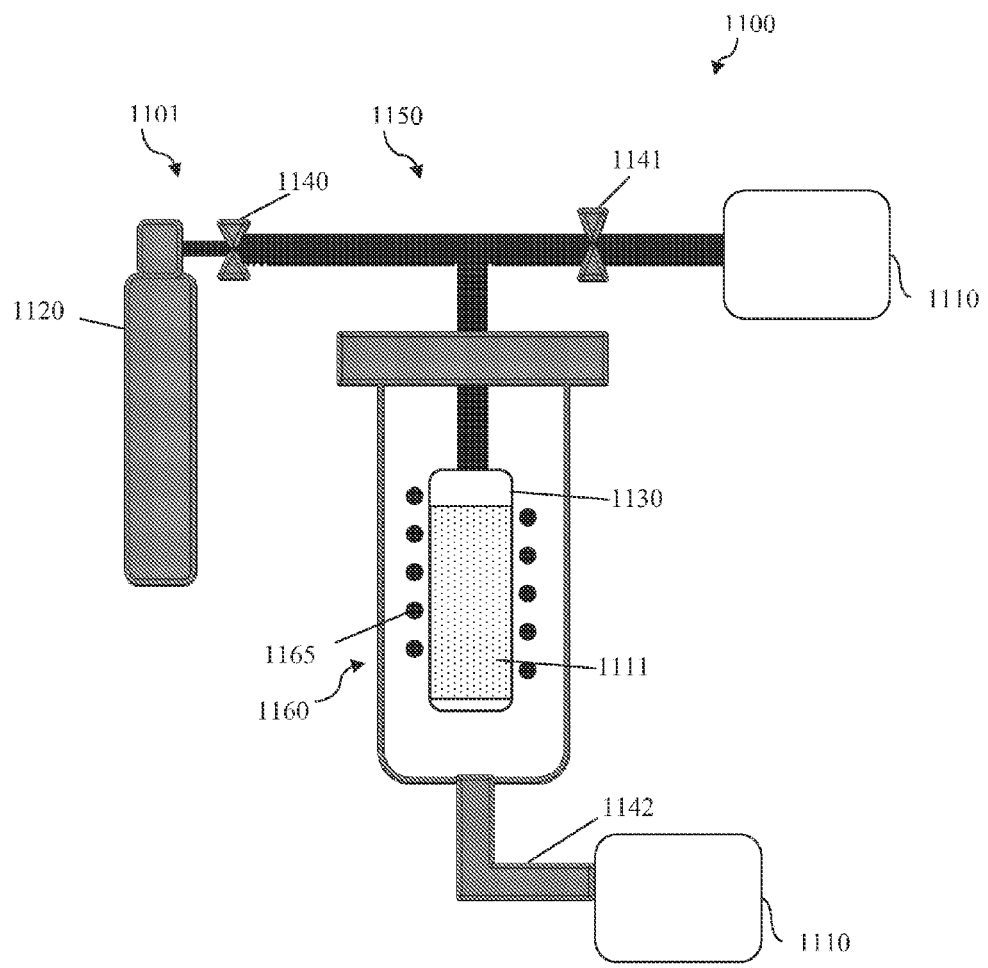
FIG. 11 is a schematic view of a gas loading system.

A low energy reaction system 1100 of the present application as shown in FIG. 11 includes a gas loading system 1101, a hydrogen gas source 1120, a pressure control system 1150 and a gas loading chamber 1130 containing nanoparticles 1111 in the solid phase. Nanoparticles 1111 can be in any form, such as a powder in the nanoscale regime, one or more structures formed from nanoparticles or the like. Pressure control system 1150 is shown in FIG. 11 as a set of vacuum systems 1110 and a set of valves 1140, 1141, 1142. Pressure control system 1150 is capable of providing a quantity of gas from hydrogen gas source 1120 to gas loading chamber 1130 and producing a reaction pressure in gas loading chamber 1130. To reduce impurity gases from entering the nanoparticle chamber in the source gas, a cryogen temperature (e.g. liquid $N_2$) may be included in the gas inlet line. One embodiment of this feature may include a cold trap (not shown) having a chamber of cryogenic material such as liquid $N_2$.

Once a preset pressure is achieved, valves 1140, 1141 can be closed to maintain the pressure and then periodically reopened for a brief time to further increase the pressure or to adjust for pressure reduction due to leakage or reaction consumption. Valves 1140, 1141 are capable of directing a first quantity of a hydrogen isotope from a hydrogen isotope gas source 1120 into gas loading chamber 1130 under a gas loading pressure provided by vacuum systems 1110. Valve 1142 may be operated to direct at least a portion of the hydrogen isotope gas from gas loading chamber 1130 thereby reducing the gas loading pressure. Still further, a second quantity of a hydrogen isotope can be loaded in gas loading chamber 1130 under another gas loading pressure provided by vacuum systems 1110. Gas loading system 1101 may be operable to cycle a loading pressure of gas loading chamber 1130 using vacuum system 1110 when providing one or more hydrogen isotopes from hydrogen gas source 1120 to gas loading chamber 1130.

A thermal management system 1160 may also be included in low energy reaction system 1100. Elements 1165 for heating and/or cooling can be used to help control temperature conditions for gas loading chamber 1130. Thermal management system 1160 may provide a vacuum space for reduction of heat conductor loses. Thermal management may be applied to a gas loading system of a low energy reaction system to provide temperature control of a reaction within the system and/or temperature control of the system. Heating elements, such as but not limited to coils, rods, radiation, microwave and the like, may be applied to contribute to the initiation of a reaction during gas loading phases. The thermal management system can employ various methods for reaction rate control including but not limited to applying a magnetic field, an electrical discharge, a plasma discharge, and a radio frequency discharge. The gas-loaded reaction is not part of a thermodynamic cycle, therefore the removal or addition of heat even at high temperatures does not affect the gas-loaded reaction efficiency.

In another embodiment, active cooling elements, such as plates, fins, tubes, fingers, pipes, pools and the like, may be applied to manage temperatures. Heating and cooling elements may be placed in various positions in the system relative to the nanoparticles to affect thermal management as one skilled in the art would understand.

Figure 15A:
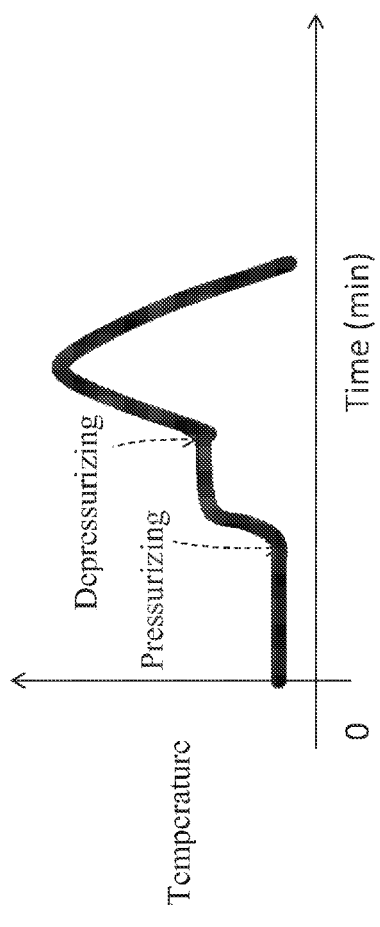
FIG. 15a is a graphical representation of a data set of a long run (temperature versus time) of a gas loading system.
Figure 15B:
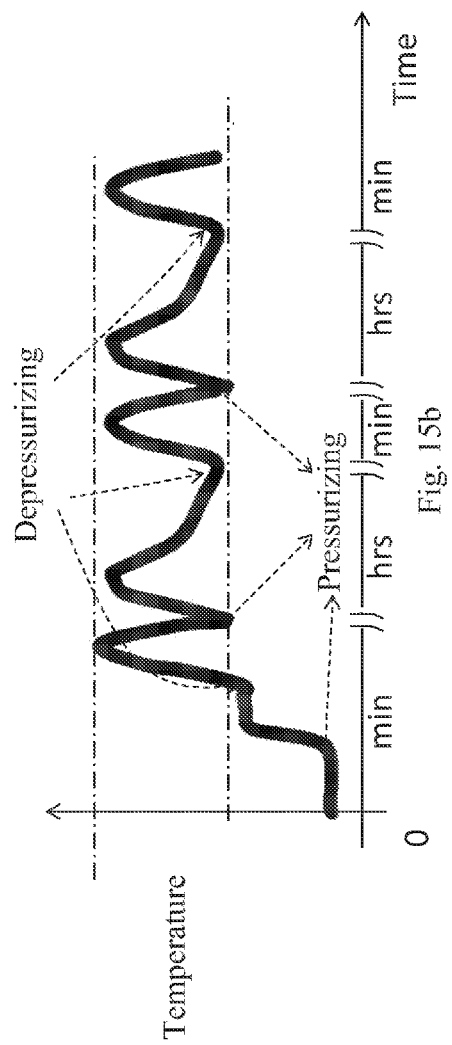
FIG. 15b is a schematic representation of a data set from a periodic depressurizing-pressurizing gas loading system.

A gas loading system may reach temperatures capable of sintering at least a portion of the nanoparticles together, setting an upper limit for the temperature controller. Operation within temperature limits may be achieved by periodic depressurizing-pressurizing steps as illustrated in FIGS. 15a and 15b. In one specific embodiment, thermal management of the system may be designed to maintain the nanoparticle bed within a band of temperatures. In one particular embodiment, the maximum temperature can be set to avoid sintering or melting of the nanoparticles in the gas loading chamber. For instance, nanoparticles in the gas loading chamber of an embodiment of the present application may include a potential for thermal variances or hot spots which may contribute to nanoparticle sintering. High temperatures in the system may lead to deteriorating or sintering of the nanoparticles within the gas loading chamber and result in loss of surface area thereby affecting the gas loading efficiencies. The sintered particles may also limit the flow of hydrogen ions from the hydrogen ion source into the gas loading chamber which initiates or maintains a reaction.

The lowest temperature can be set such that an LENR reaction rate is self-maintained (experiments show that reactions decay if the bed temperature is below a certain value). Operation near the upper temperature limit is preferable because following the Carnot law for ideal efficiency, the efficiency for heat conversion to electricity increases as the difference between the maximum temperature and the heat sink temperature increases. The thermal management system may further include a temperature monitor. In one embodiment, a gas loading system monitors an operating temperature of the gas loading chamber and nanoparticles. The gas loading system may cycle a loading pressure of the gas loading chamber removing and providing one or more isotopes of hydrogen in response to the operating temperature. However, if sudden pressure changes are employed to maintain operation, a slow decrease in temperature towards the minimum limit may result. In that instance, the system may maximize the time-averaged temperature during operation.

The gas loading system may include a single chamber within the system or may constitute a variable number of chambers with various geometries possible. Variation in the chamber design may affect thermal properties, gas flow properties, nanoparticle filling properties and the like. In another embodiment, a hydrogen gas source may include hydrogen ions such as $^1$H, $^2$H or D (deuterium), $^3$H or T (tritium). In yet another embodiment, a pressure control system may include at least one pressure valve or a system of pressure control apparatuses to facilitate and maintain the gas loading pressure, facilitate depressurizing the system and facilitate alternating between pressurizing and depressurizing phases. Such valves may allow setting the rate of pressure change in these operations.

Referring to FIG. 11, gas loading chamber 1130 includes at least a partial fill of nanoparticles 1111. The partial fill of nanoparticles may result in a gas reservoir under pressure related to the nanoparticle bed within the gas loading chamber, a degree of freedom in nanoparticle movement in the gas loading chamber, and the like which may contribute to the efficiency level of the gas loading system. In other embodiments, the gas loading system may include a filter to keep nanoparticles from escaping. This filter may include a fine-woven clothe of sufficient mesh size to prevent passage of the particles but allow gas flow with minimum pressure drop. A filter may be placed at an inlet position relative to the gas loading chamber. A filter may also be placed at the surface of the nanoparticle bed inside the gas loading chamber. A substantially full nanoparticle bed or a filter placed on the bed surface may be capable of affecting the efficiency of the gas loading system.

Figure 14:
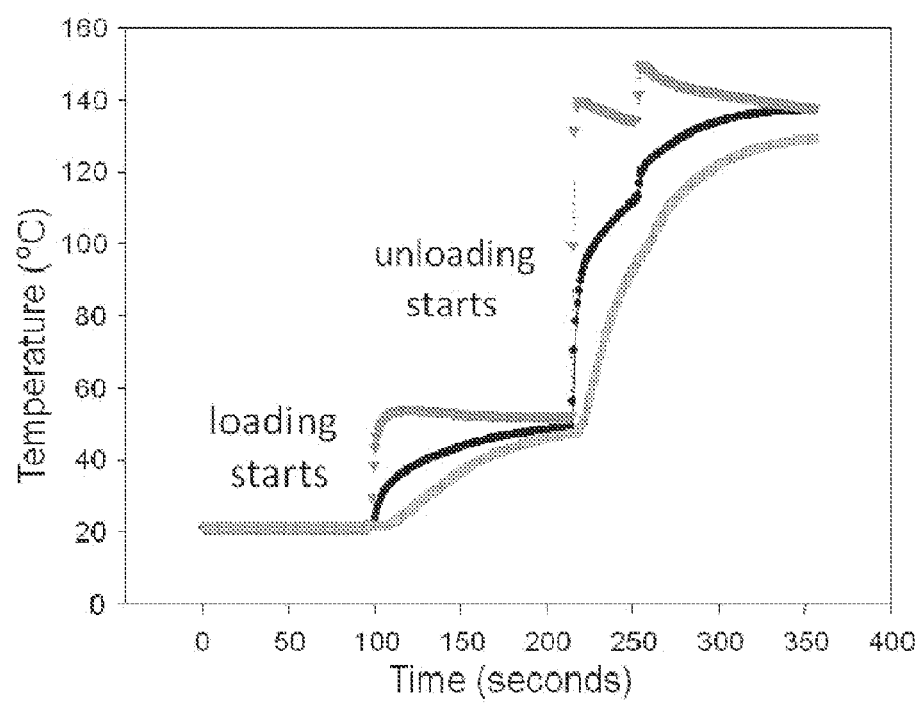
FIG. 14 is a graphical representation of a data set from a pressurizing-depressurizing gas loading system.

In one embodiment, gas loading of the gas loading chamber containing nanoparticles may be a triggering event for reactions. Other triggering events may be present, such as but not limited to pressure pulses, initial heating by exothermic chemical reactions, and external heating. Alternatively, a series of load, gas react, release and reload gas events may be applied. When gas is loaded to the system, the increase in pressure provides an increase in temperature due to the exothermic chemical reactions associated with the gas absorption. The initial increase in pressure and temperature may be the catalyst for a series or group of exothermic reactions. These exothermic reactions may contribute to a further increase in temperature. In another embodiment, a sudden depressurization of a low energy reaction system of the present application may trigger a second temperature increase instead of a temperature decrease as would be expected with a decrease in pressure due to the endothermic chemical reactions associated with desorption under typical operating conditions. FIG. 14 is a graph of a representative data set showing the temperature increase after gas loading has started, a somewhat steady-state phase and another temperature rise when unloading starts. The sudden depressurization may be provided through the pressure control system.

During the adsorption of the hydrogen ions by the nanoparticles while gas loading under pressure in the gas loading system, an exothermic reaction may take place. The chemical reaction energy may be expressed as:

Chemical Reaction Energy=$\Delta H \times M_{D2}$ $\Delta H$=−35,100 J per mole of $D_2$ for the formation of $PdD_x$ for x<0.6;

$M_{D2}$ is the total moles of $D_2$ that combined with Pd. Consequently, the total energy (chemical+nuclear) calculation may be expressed as:

Total energy=$\Delta T(M_{chamber} S_{chamber} M_{powder} S_{powder} M_{gas} S_{gas})$ where $\Delta T$ is temperature change, M is mass and S is specific heat. Chamber subscripts indicate the total chamber values, powder subscripts represent the nanoparticles contained therein, and gas subscripts represent the gas contained in the chamber. The total heating energy may be calculated by considering the heat capacity of both the gas loading chamber and the nanoparticle powder inserted into it.

In another embodiment, the efficiency of a reaction within the gas loading system may be in relation to the cluster loading plus the flow or flux of hydrogen ions into or through the nanoparticles. This is analogous to the loading and ion flow or flux effect for thin film plate geometry structures illustrated earlier in FIGS. 1, 1a and 1c. Ion flow may provide reactant interactions by transfer of energy and momentum to cluster atoms, keep the system from becoming stagnant, and the like. After gas loads a gas-loading chamber, the flow of ions in the nanoparticles continues but decreases as the loading reaches a maximum value. Following which the flow occurs to replace reacted isotopes and to fill new voids that may be created in the particles. A sudden depressurization may trigger a flow of ions with an internal pressure capable of forcing a more efficient flow.

In yet another embodiment, a process begins with gas loading a gas loading chamber of nanoparticles. As the reaction(s) are initiated and the temperature increases, a quasi-steady-state may be reached. Along the reaction timetable, the temperature may begin to decrease. At a point along the temperature curve, a sudden depressurization of the gas loading system may be provided. The depressurization may be used to reestablish the ion flow within the nanoparticles, but rather than inward flow as during pressurization, this flow is outward as the previously absorbed gas is desorbed. The depressurization flow may cause an increased transfer of momentum to the atoms in the yet un-reacted cluster deposits, therefore increasing the reaction rates in these clusters. However, as the chamber pressure drops, the flow may begin to decrease since the absorbed ion density decreases, causing a corresponding decrease in temperature. At some point the chamber may be quickly re-pressurized, thus re-establishing an inward flow or flux of ions in the nanoparticles. The inward flow may increase momentum flow such that the reaction rate and temperature again increase until the inward flux slows down as the absorption begins to saturate. However, in such an embodiment, while the pressure is maintained, the slow drop in reaction rate that follows may be slower than the drop after a sudden depressurization where the pressure remains low during the drop period. Such a cyclic method, starting with pressurization and depressurization, then re-pressurization and re-depressurization etc. may allow long runs such as months or years, with the temperature of the packed bed being maintained between a predetermined range of maximum and minimum temperature bounds. Timing for cyclic pressurization-depressurization may determine the upper and lower bounds for the temperature. For an embodiment which operates as a "heat engine" (i.e. conversion of a heat source to electrical output), the Carnot Cycle theoretical efficiency indicates that the highest maximum temperature (while avoiding damage to the nanoparticles) and a small difference between upper and lower temperature bounds may be determined.

Two embodiments of temperature control are illustrated schematically in FIGS. 15a and 15b. FIG. 15a illustrates a cycle without temperature control. In this embodiment, the temperature rises quickly to a maximum value upon start up and then decays quickly while the chamber remains depressurized. In the embodiment shown in 15b, cyclic pressure control is used to maintain operation over a long period of time. In this embodiment, an initial start-up is essentially the same as in FIG. 15a, but after the rapid temperature fall with depressurization, re-pressurization and a corresponding temperature rise follow. The subsequent fall-off in temperature may be slower in response to the chamber remaining pressurized. The pressurization/depressurization cycle may be repeated. The process described in this embodiment may be one of several methods that may be applied to achieve temperature control for long runs. Other methods may include, but are not limited to, depressurization and pressurization (reverse sequence from FIG. 15b), and use of external factors such as ultrasound, laser radiation, plasma sparking, external heating and external cooling. FIG. 15b illustrates the application of pressurizing and depressurizing.

In another embodiment, there are several possible locations that may promote cluster formation which may represent an ability for maximizing the density of clusters, hence maximizing the reaction rate densities in this configuration. Nanoparticles having hydrogen/deuterium clusters located in the interstitial spacing of the nanoparticles are schematically shown in FIGS. 12, 12a, and 12b. Under pressure and in a gas loading chamber, hydrogen clusters 1220, 1230, 1240, may be formed in void spaces. Void spaces may include the interstitial space between nanoparticles 1210 and in natural formations 1230 such as but not limited to channels, holes and pores. Pores may be formed with necked off passage to the surface which may be produced by surface melting during heating of the nanoparticles. Further, voids 1250 (or dislocation loops) may be formed near the surface of an individual nanoparticle 1210. In the schematic illustrations of FIGS. 12, 12a and 12b, nanoparticles are represented as spheres, but nanoparticles may have a variety of shapes. Nanoparticles 1210 may have more surface area than thin films and thus a larger area for hydrogen clusters 1220 to locate; thereby increasing the relative density of cluster atoms 1220 in nanoparticles 1210.

During operation of an embodiment of the present application, clusters may disappear due to reactions taking place while others may be formed as new void spaces are created, representing a dynamic situation. If the net number of unreacted clusters decreases, it may be necessary to remove the nanoparticle bed and reload the chamber with fresh nanoparticles to initiate a new run. In a modified chamber design, fresh particles located in a separate chamber could be rotated in to minimize downtime. Likewise a new gas source can be inserted as needed or multiple sources may be incorporated into the system to allow "in place" switching.

In addition to the added surface to volume advantage, nanoparticles may be manufactured using select sizes, select alloy materials and select surface roughness conditions to further increase hydrogen isotope cluster density. In one non-limiting embodiment, nanoparticles are manufactured by grinding alloyed billets, rods, bricks and the like. Grinding may include ball milling. Preparing nanoparticles may include processes such as but not limited to milling, annealing, supplemental annealing, sizing, filtering and combinations thereof. The resulting nanoparticles may include a surface area and topography including local surface roughness which may contribute to hydrogen loading and cluster formation. Other embodiments may include nanoparticle manufacturing processes which produce various other surface topographies and roughness as known in the art.

Figure 13:
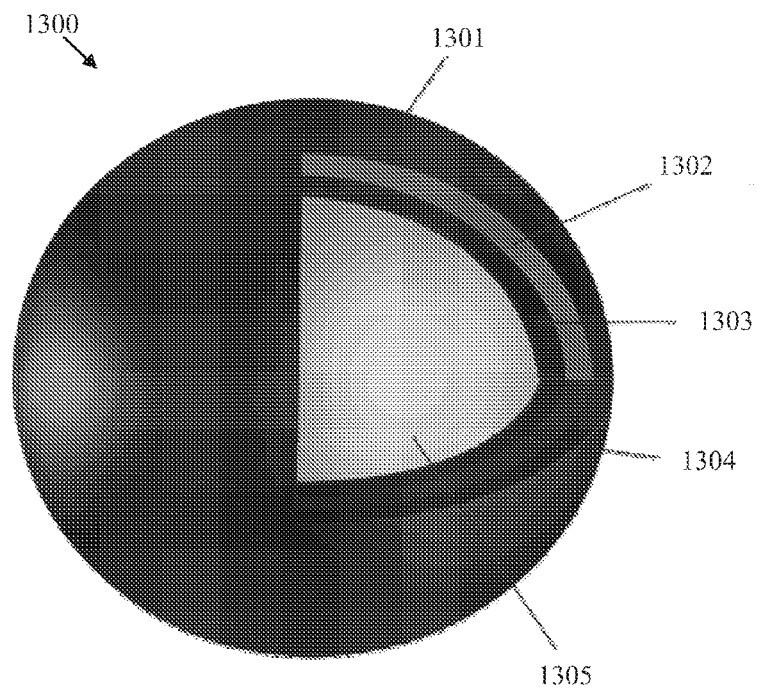
FIG. 13 is a schematic with a cut-away view of a particle structure.

For one embodiment, a microsphere design may include layers of metals with dissimilar Fermi levels to increase the hydrogen ion density during gas loading. For an alternate embodiment, a microsphere plastic or ceramic core can include layers of metals with dissimilar Fermi levels to increase the electron density at the metal surfaces during gas loading. A microsphere 1300 with a sputter coating is shown in FIG. 13 with a core material 1305, an intermediate layer 1304 which may be a copper flash and the like, a first metal layer 1303, a second metal layer 1302, and a repeated first metal layer 1301. In one specific embodiment, the first metal may be nickel and the second metal may be palladium. In a variation, the microsphere design may substitute the low Z metals in the layers.

In various embodiments, nanoparticles may include a Pd-rich composition and a Ni-rich composition. The Pd-rich nanoparticle composition may be gas loaded with high purity $D_2$ (or heavy water). The Ni-rich composition may be gas loaded with $H_2$ (or light water). The Pd-rich composition may include up to 100 weight percent palladium. The Ni-rich composition may include up to 100 weight percent nickel. Alloying elements such as but not limited to zirconium may be included along with palladium and nickel to contribute to the efficiency of the gas loading system by including metals in the alloy with dissimilar Fermi levels. Alloying compositions may include, for example:

35 weight percent palladium and 65 weight percent zirconium with $D_2$ loading;

20 weight percent palladium, 15 weight percent nickel and 65 weight percent zirconium with $H_2$ or $D_2$ loading; and 35 weight percent palladium, 15 weight percent nickel and 50 weight percent zirconium with $H_2$ or $D_2$ loading.

One aspect of the present application is a method having the steps of operating a gas loading system including: a source of one or more isotopes of hydrogen, a gas loading chamber containing a number of metallic nanoparticles, the nanoparticles being selected to provide for a predetermined hydrogen cluster formation density, a vacuum system, and a valve system in communication with the gas loading chamber, the source of one or more isotopes of hydrogen and the vacuum system; providing the gas loading chamber with a first quantity of the one or more isotopes of hydrogen from the source of one or more isotopes of hydrogen; monitoring an operating temperature; and cycling a loading pressure of the gas loading chamber using the source of one or more isotopes of hydrogen in response to providing the gas loading chamber and monitoring the operating temperature.

Features may include the metallic nanoparticles being a palladium rich alloy and the first quantity of the one or more isotopes of hydrogen being deuterium ($D_2$) and where the palladium rich alloy further includes about 35 weight percent palladium and about 65 weight percent zirconium; and the metallic nanoparticles being a nickel rich alloy to produce a quantity of nanoparticles and the first quantity of the one or more isotopes of hydrogen further being hydrogen ($H_2$) and where the nickel rich alloy further includes about 20 to about 35 weight percent palladium, about 15 weight percent nickel and about 50 to about 65 weight percent zirconium. Another feature may include providing a thermal management system where the thermal management system may further include at least one of a heating element and a cooling element. Yet another feature may include: removing impurities with a vacuum in the gas loading chamber containing the number of metallic nanoparticles; and desorbing a quantity of gases by heating the gas loading chamber containing the number of metallic nanoparticles.

Another aspect of the present application is a system including a gas source to provide one or more isotopes of hydrogen; a plurality of metallic nanoparticles; a chamber containing the metallic nanoparticles and structured to receive the one or more isotopes of hydrogen from the gas source; a vacuum system; a valve system in communication with the chamber, the gas source and the vacuum system where the valve system is capable of directing a first quantity of the one or more isotopes of hydrogen from the gas source into the chamber under a gas loading pressure provided by the vacuum system and directing a second quantity of the one or more isotopes of hydrogen from the chamber thereby reducing the gas loading pressure.

Features of this aspect may include the valve system being capable of directing a third quantity of the one or more isotopes of hydrogen from the gas source into the chamber under a second gas loading pressure provided by the vacuum system and having a first valve to disconnect the vacuum system from the gas loading chamber and a second valve to disconnect the hydrogen gas source from the gas loading chamber; the nanoparticles may include a palladium alloy where the first quantity of hydrogen includes deuterium ($D_2$) and where the palladium alloy may further include about 35 weight percent palladium and about 65 weight percent zirconium; the nanoparticles may include a nickel alloy where the first quantity of hydrogen includes hydrogen ($H_2$) and where the nickel alloy may further include about 20 to about 35 weight percent palladium, about 15 weight percent nickel and about 50 to about 65 weight percent zirconium.

A further feature of this aspect includes a thermal management system which may include at least one of a heating element and a cooling element. Yet another feature may include directing a quantity of initial gases from the chamber containing the nanoparticles where the thermal management system is capable of modifying a temperature of the chamber containing the nanoparticles during directing the quantity of initial gases.

Yet another aspect of the present application is a method including the steps of providing several nanoparticles each comprised of at least one of: Pd, Ti, Ni, Li, Au, Ag, and U; pressurizing a chamber containing the nanoparticles with one or more isotopes of hydrogen gas to load the nanoparticles with a predetermined density of hydrogen clustering; and depressurizing the chamber to induce a reaction in the chamber. Features of this aspect may include the nanoparticles being a palladium rich alloy and the one or more isotopes include deuterium ($D_2$); and the nanoparticles being a nickel rich alloy and the one or more isotopes include hydrogen ($H_2$). Further features may include forming at least one nanoscale void in the multiple of nanoparticles where forming the at least one nanoscale void may include forming one or more of a void, a channel, a pore, a hole, and an interstitial space.

As used herein, the term "nanoscale" refers to a dimension of 100 nanometers or less, and the term "microscale" refers to a dimension of 100 micrometers or less. As used herein, the term "nanoparticle" refers to a solid material at standard temperature and pressure that has a maximums in two dimensions (such as width and depth) equal to or less than 100 nanometers, and a maximum in a third dimension (such as length) that may or may not exceed 100 nanometers. While these dimensions are generally desirable, operation with variants around these sizes is also possible. The term "metallic" refers to any composition comprising a metal atom, including but not limited to a substance comprising multiple atoms of the same metal, alloys of two or more different metal atoms, oxides of a metal, salts of a metal, organometallic compounds, and the like.

Experimental Observations

The following experimental observations are intended to enhance clarity and understanding of the inventive aspects of the present application and are not meant to be restrictive in character.

Studies have been performed in which hydrogen isotopes ($^1H$, deuterium (D or $^2H$), and/or tritium (T or $^3H$)) have been loaded into thin-film electrodes comprised of selected metals such as palladium (Pd), titanium (Ti), and nickel (Ni). These studies indicate creation of dislocation cores in the metallic lattice that are capable of fostering hydrogen cluster formation of the type indicated in FIG. 2. Evidence of such formation includes: localized low energy nuclear reaction products observed in electrodes after thin film electrolysis, localized energetic charged particle tracks in CR-39 track detectors located on surface of electrodes during thin-film electrolysis, X-ray "beam-let" formation from localized sites during pulsed plasma bombardment of thin film electrode targets, high binding energy between hydrogen and host materials verified by temperature programmed desorption experiment, and electromagnetic SQUID and three point conductivity measurements indicating type II superconductivity below 70° K in dislocation sites. Because the density of hydrogen or hydrogen isotopes in these sites approaches that of metallic hydrogen, they are termed "clusters" and can be viewed conceptually as in FIG. 2. Consequently, because the atom spacing in these clusters is so small, very little added energy or momentum is required to cause them to overcome the Columbic repulsion barrier and react. As discussed here, one method to induce reactions is through momentum transfer to the cluster by diffusing ions (i.e., an ion flux into the cluster). Increased thermal vibration as the temperature is increased can also initiate reactions.

More specifically, a variety of thin film electrode electrolysis experiments demonstrate local reaction sites. Early studies used a multilayer thin-film electrode with alternating layers of materials such as Pd and Ni that have a Fermi energy level difference such as to cause a high electron density (termed the "swimming electron layer") at the interface between thin films. Later studies used either thin films coated on microsized plastic beads or a unique thin-film cathode-anode combination coated onto a substrate (typically a silica or ceramic sheet). In this configuration, the electric field during electrolysis is parallel to the substrate, hence along the surface direction of the thin films. This electric field causes a hydrogen isotope ion flow (or "flux") in addition to the loading, thus enhancing a reaction by collisional momentum transfer to cluster atoms. It is observed from broad area Secondary Ion Mass Spectrometry (SIMS) analysis of these electrodes that the reaction products tend to occur in localized areas distributed across the electrode. In addition, localized areas of heating have been observed. Both the localization of products and the hot spot damage areas are indicative that reactions take place at micro-sized sites.

CR-39 tracking film is a well-known method for detection of energetic charged particles. CR-39 is a plastic which is damaged by passage of a charged particle. Subsequent etching in a NaOH solution exposes a visible track under a reasonable resolution microscope. Measurement of the diameter and length of the track using a microscope then gives definitive data about the particle involved. CR-39 detectors were placed next to thin film electrodes during electrolysis. CR-39 detectors (manufactured by "Landauer Co.") rad-track chips; 5=2.0×1.0 cm$^2$ were attached to Pd/Ni thin film cathode; to the substrate side and/or immersed in electrolyte in the cell near the electrode. The detectors were annealed to have a low initial Background before electrolysis: N(Bg)<40 track/cm$^2$. Some of the CR-39 was covered with a 25 μm Cu-film to identify the type of emitted particle by its ability to penetrate this film. Several tracks from the CR-39 film after etching were observed. Analysis of the track sizes correspond to 1.7 MeV protons and 14.7 MeV alpha particles. Such particles originate from nuclear reactions where chemical or other phenomena cannot produce such energetic (MeV) particles.

Various plasma discharge experiments were performed in which a deuterium gas based discharge bombards a thin-film Palladium target (cathode) in a pulsed plasma discharge. Anomalous soft x-ray emission from the target is observed which is attributed to formation of an ion cluster type formation in the target during the pulsed loading. An experimental Glow Discharge (GD) setup was used for these studies. A positive voltage is applied at the anode. The cathode and vessel were grounded. Plasma is produced between this and the water-cooled cathode. The cathode is mounted on a movable mount to vary electrode spacing while the GD plasma region is surrounded by a glass cylinder to prevent arcing. An AXUV photodiode detector is used for x-ray detection. A thin Be filter was employed to block visible light from the detector. This filter cuts off x-rays<600-eV. A typical result from this detector indicates peak X-ray emission at p=500 mTorr V=250V I=2 A for a thin film Pd cathode. The delay time on the order of ~msec before onset of x-rays is associated with D diffusion time into the target starting at the beginning of the pulsed discharge. Due to the filter X-rays are >600 eV while the discharge voltage is 250 V. This suggests x-ray generation is due to collective effects occurring in the cluster where the x-rays originate. A reference experiment where a thin copper foil was placed in front of the Be filter causes the trailing spike (i.e. the x-rays) to disappear, which confirms that the x-ray signal is not due to extraneous noise pick-up. Further supporting evidence that x-ray emission is from localized sites comes from related experiments by A. Karabut, who placed a plastic "window" in the path of the x-ray beam and observed a damage pattern having numerous small isolated spots. In summary, these x-ray studies support the existence of reactive clusters in a metal target such as Pd using a plasma bombardment of thin electrodes. In this case, the pulsed bombardment causes a strong inward hydrogen isotope transport which can stress the metal causing dislocation void formation which in turn provides the site for cluster formation. In this sense, pulsed plasma loading of hydrogen is an alternate technique to electrolytic loading described earlier.

The superconductivity of cluster-type states formed in dislocation sites in Pd has been studied. These experiments used a special cyclic "loading-deloading" technique to create stress-induced dislocation sites fostering cluster formation. Two separate techniques were used in the study: (1) H$_2$ gas pressure loading-deloading cycles were applied to a single crystal thin film Pd electrode with the deloading taking place for 2 hours. Alternately, electrochemical cycling (cathode loading-anodic deloading) with a current of 5.0 mA/cm$^2$ in 1M Li$_2$SO$_4$/H$_2$O was used with a Pd/PdO cold-worked electrode. Both electrodes were initially prepared by annealing for 2 hours at about 580 K. The electrodes were subsequently examined for ferromagnetic properties associated with superconductivity using a "Quantum Design" 1T-SQUID type instrument operating in either DC or AC modes. The results from the SQUID measurements are summarized as follows. After repeated H-cycling, both the Pd:H$_x$ and Pd/PdO:H$_x$ samples contained an ultra-high density condensed hydrogen phase inside the dislocation sites or "cores" (void regions). While the average loading ratio (atoms H/Pd) of the electrodes was only (3.8–5.5)×10$^{-4}$ with respect to the gross sample volume, local loading ratios (defined as the rates of H or D to immediately surrounding Pd lattice atoms) as high as ~5-1000 occurred inside the clusters formed in the small dislocation cores. The loading ratio in the cluster region depends on the core size relative to the lattice spacing. In the present case loading ratios varied over a large range due to a random distribution of core sizes. The SQUID measurements of the electrodes demonstrated a weak type II superconductivity, involving a condensed hydrogen phase in the dislocation sites (i.e. "cores") below ~70 Kelvin (K). A reproducible Meissner-effect was observed in 1 kHz AC field at H≤1.0 Oe. In summary, these results show that the localized clusters are in a condensed mode giving metallic-like properties with low temperature superconductivity properties in the H-loaded dislocation cores corresponding to hydrogen clusters.

The hydrogen clusters formed in the H-loaded dislocation sites are stable unless a triggering technique occurs which causes a diffusing hydrogen or deuterium ion to enter the cluster region and transfer momentum to a cluster atom. Subsequent reactions can be appropriately described as pyconuclear reaction theory. Pyconuclear reactions in astrophysical objects address behavior of a high density of hydrogen isotopes, and correspondingly provide a basis for considering hydrogen cluster behavior in dislocation cores, because the atom density in these clusters is similar. Such reactions are believed to take place even at "zero temperature" in condensed matter due to ions fluctuating about their lattice sites in coherence with the zero-point energy, $E_0 \approx \hbar \omega_0$. The addition of momentum by the "triggering" event already noted can be viewed as elevating the "temperatures" as subsequent collisions equalize the added fluctuations over the cluster atoms. Due to close spacing and this fluctuation, these ions may penetrate the Coulombic barrier of a neighboring ion causing nuclear reactions provided there is a sufficient flux of ions to transfer momentum to the stationary cluster atoms.

In hydrogen-loaded dislocation cores or nanoparticle structures, cluster or ions have a close spacing and a higher fluctuation frequency because they have a finite temperature. Pyconuclear principles can be applied with a temperature (fluctuation frequency) correction. Further, hydrogen-loaded cluster or particle behavior is also enhanced by the strong diffusion (sometimes called "hopping") of the hydrogen isotope (such as H or D) during loading (or deloading). The diffusing ions flow through the cluster or ion sites, undergoing collisions with the cluster or ion atoms, thus transmitting momentum to them. This enhances the oscillations of the cluster or ion atoms and can be roughly account for the added collisional energy. Calculations based on this theory, show that the higher reaction rates such as observed in the low energy reaction experiments correspond to this flow. The electrolytic thin-film experiments have a relatively high flow of "flux" correction due to the design of the electrodes in FIG. 1a creating a driving electric field. The low rate radiation emission experiments have a much lower flow correction while superconducting structures do not involve flow.

Reaction rate calculations without flow based on conventional Pyconuclear reaction theory are presented as follows along with calculations where the flow is included through use of an effective temperature. Now turn to reactions in a crystal lattice or interstitial spacing. The reaction rate per ion pair is $$W = (inc.flux) \times T \times 4\pi R_n^2 P_n$$
$$\equiv v|\psi_{inc}|^2 \frac{TS(E)}{E}$$

where we have to caculate $|\psi_{inc}|^2$ and T using the lattice potential for $r > R_n$. The measured nuclear factor S(E) remains the same as before.

$$P_0 = \left(\frac{\rho}{A}\right) A^2 Z_\lambda^4 S_\lambda \lambda^{\frac{7}{4}} \exp\left(-\varepsilon \lambda^{-\frac{1}{2}}\right) s^{-1} cm^{-3},$$

with $$\gamma = 3.90 \times 10^{46}, \varepsilon = 2.638.$$

Results using these calculations confirm that the reaction rate strongly depends on dislocation core or inter-particle loading and on flow rate. For example, in the cyclic loading-deloading a low rate of charge particle emission was seen from CR-39. Much higher reaction rates were obtained in thin film reactions. The cluster or ion loading (atoms of D/atoms Pd) along with the flow rate were varied in calculations to match the experimentally observed reaction rates (rx/cm3-sec): (a) for low rates of ~1 reaction/cm³-sec, as in the CR-39 tracks during unloading (flow), a local loading of ~8 D/Pd matches without flow and for flow matching of the deloading value, only ~2 D/Pd are required; and (b) for high reaction rates, e.g. $10^{14}$ reactions/cc-s, a local loading of 12 D/Pd matches with an estimated flow 5× the deloading value used above. Consequently, developments in pyconuclear astrophysics are consistent with hydrogen cluster or ion behavior in dislocation or inter-particle sites. Because of its nonlinearity, it is expected that the predicted reaction rate increases rapidly with higher hydrogen isotope loading and flow rate. Further, with little or no flow rate, a viable superconducting state results in correspondence to the degree of loading.

Many further embodiments of the present application are envisioned. For example, one further embodiment comprises: establishing a predefined target representative of a desired dislocation core density of a multilayer thin film device design; forming a multilayer thin film device according to the design; and after forming it, loading the multilayer thin film device with an amount of one or more isotopes of hydrogen to form hydrogen clusters in the dislocation cores. In one form, the formation of the multilayer thin film device includes providing a first layer of a first type of metal and a second layer of a second type of metal dissimilar from the first type of metal, and preparing an interface between the first layer and the second layer to increase a quantity of the dislocation cores there along and in correspondence with the predefined target.

Another example includes preparing a multilayer thin film device including a first layer of a first type of metal and a second layer of a second type of metal dissimilar from the first type of metal; repetitively loading it and deloading the device with one or more isotopes of hydrogen at least ten times during the preparing thereof; and supplying a flow of at least one isotope of hydrogen to operate the device.

Still another example comprises: a multilayer thin film device including a first layer of a first type of metal and a second layer of a second type of metal dissimilar from the first type of metal, means for repetitively loading and deloading the device with one or more isotopes of hydrogen during the preparation thereof, and means for supplying a flow of at least one isotope of hydrogen to the device.

Yet another embodiment comprises: preparing a multilayer thin film device including a first layer of a first type of metal and a second layer of a second type of metal dissimilar from the first type of metal; providing nanoscale voids along an interface between the first layer and the second layer during the preparing of the multilayer thin film device, which includes at least one of (a) placing nanoscale material along the interface and (b) forming one or more of a plurality of channels, pores, holes, or voids in one or more of the first layer and the second layer, and supplying one or more isotopes of hydrogen to the device to form hydrogen clusters therein.

A further example includes: a source of one or more isotopes of hydrogen, a multilayer thin film device in communication with the source to receive the one or more isotopes of hydrogen therefrom, the multilayer thin film device including a first layer and a second layer of a different material than the first layer, the first layer being of a metallic type effective to form a hydride with the one or more isotopes of hydrogen, an interface between the first layer and the second layer and a material positioned along the interface to form a plurality of nanoscale voids to increase a quantity of dislocation cores formed along the interface and correspondingly increases loading of the one or more isotopes of hydrogen from the source. In one form, the material includes one or more of micro-scale particles, fibers, wires, and mesh. Alternatively or additionally, the material includes a porous metallic substance.

Still a further embodiment comprises a multilayer thin film device including a first layer with means for forming a hydride with one or more isotopes of hydrogen and a second layer of a material different than the first layer; means for increasing dislocation core formation along an interface between the first layer and the second layer; and means for supplying the multilayer thin film device with at least one isotope of hydrogen.

In an embodiment of the present application, a thermal transducer is capable of converting a first portion of thermal energy produced by a gas-loaded reaction generator. In various embodiments, the thermal transducer can convert thermal energy into another form of energy such as but not limited to electrical, mechanical, electromagnetic, chemical and acoustical energy.

An example of one embodiment for a thermal transducer is a thermal-electric generator. Thermal-electric generators can include a solid state device that converts heat to electricity. Electrical power is produced from heat or thermal energy flow across a temperature gradient of thermoelectric elements with a resulting voltage proportional to the difference in temperature. One device of one embodiment can be a system of small thermo-electric devices in series.

Other embodiments can include dynamic 'thermal to electric' generators such as Rankine, Brayton and Stirling engines. For a dynamic generator, a working substance can be a liquid or gas. The working fluid, which expands when heated, drives the mechanics of the engine. High temperature heat can be applied to turbine style generators. In one embodiment, a gas-loaded reaction system includes a gas-loaded reaction generator proving at least a portion of thermal energy to a thermal transducer which transfers heat energy to a water medium in order to create steam. The steam is then provided to an electrical generator such as a steam turbine to generate electricity.

In one form, a heat transfer device is capable of applying a second portion of thermal energy produced by the gas-loaded reaction generator. A heat transfer device can, in some embodiments, be configured to transfer thermal energy to another medium such as but not limited to water, liquid metal and helium. In one embodiment, a gas-loaded reaction system includes a gas-loaded reaction generator proving at least a portion of thermal energy to a heat transfer device which transfers heat energy to a water medium in order to create steam. The steam can then be provided to an electrical generator such as a steam turbine. In other embodiments, other heat transfer fluids such as helium gas can be utilized in place of water to drive a gas turbine. The heat transfer device does not necessarily follow the thermal transducer in the system nor is the portion of thermal energy provided to the heat transfer device necessarily less that the portion provided the thermal transducer.

In other embodiments, heat transfer devices can operate as waste heat recovery devices. Waste heat recovery devices can be operated to heat air and water for various cooling and heating uses such as but not limited to hot water consumption, climate control and industrial processing. In one embodiment, the waste heat can be transferred to a medium suitable for use in a heat engine such a Stirling engine. In further embodiments, the heat transfer device can provide thermal energy to balance of plant energy conversion systems to operate components such as but not limited to blowers, compressors, pumps and water cooling in an industrial environment. Another embodiment couples a gas-loaded reaction generator directly to a heat transfer medium such as water, liquid metal or helium to feed a balance of plant energy conversion system such as a turbine.

A gas-loaded reaction system can include a co-generation system with both electricity and heat produced as end products. Other embodiments can include a distributed energy system which generates power from many separate small energy sources each located close to the user. Distributed energy systems can be on a small scale like thermal-electric generators in series to power electronics. Large scale distributed systems can include, for example, several thermal generators or heat engines powering residential or commercial energy uses. The size and power of a gas-loaded reaction system can be modified to provide service to a large number of customers in a local community, a large city or a wide service region connected via an electrical grid. In still other embodiments, the gas-loaded reaction system can supply heat for industrial applications such as but not limited to a chemical production plant to produce, for example, syngas, fertilizer, petroleum products and the like. The gas-loaded reaction system of the present application can be applied in various industries including chemical, paper, refining, food processing, and metal manufacturing.

Further applications of the gas-loaded reaction systems can include forward operating base power generation. Another embodiment can include a mobile application such as but not limited to an automobile, a locomotive, a space propulsion unit, a space electrical power unit for space probe power for space vehicle, satellite, or station keeping.

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow. In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary. The present application hereby incorporates by reference all publications, patents and patent applications set forth herein, including but not limited to: G. H. Miley, and J. A. Patterson, "Nuclear Transmutation in Thin-film Coatings Undergoing Electrolysis," *Journal New Energy*, Vol. 1, pp. 11-15 (1993); G. H. Miley, G. Name, T. Woo, "Use of Combined NAA and SIMS Analyses for Impurity Level Isotope Detection," *Journal of Radioanalytical and Nuclear Chemistry*, Vol. 263, No. 3, pp. 691-696 (2005); G. H. Miley and P. J. Shrestha, "Review of Transmutation Reactions in Solids," *Condensed Matter Nuclear Science*, P. Hagelstein and S. Chubb, eds., World Scientific Press, New Jersey, pp. 364-378 (2006); A. G. Lipson, G. H. Miley, A. S. Roussetski, and E. I. Saunin, "Phenomenon of Energetic Charged Particle Emission from the Hydrogen/Deuterium Loaded Metals," *Condensed Matter Nuclear Science*, P. Hagelstein and S. Chubb eds., World Scientific Press, New Jersey, pp. 539-575 (2006); G. H. Miley and A. G. Lipson, "Intense X-ray Emission from Highly Loaded Hydrides," *Proc. of SPIE*, Vol. 5197, p. 35 (2004); A. Lipson, G. H. Miley, et al., "Emergence of a High-Temperature Superconductivity in Hydrogen Cycled Pd Compounds Suggest Localized Superstochiometric H/D Sites," *Proceedings, ICCF-12*, Nagoya, Japan (2005); Lipson, B. Heuser, C. Castano, G. Miley, B. Lyakhov, and A. Mitin, "Transport and Magnetic Anomalies below 70 K in a Hydrogen-cycled Pd Foil with a Thermally Grown Oxide," *Physical Review*, B 72, 212507, December 13 (2005); S. Ichimaru and H Kitamura, "Pyconuclear Reactions in Dense Astrophysical and Fusion Plasmas," *Phys. Plasmas*, Vol. 6, No. 7, pp. 2649-2671 (1999); X. Yang, G. H. Miley, K. A. Flippo, S. A. Gaillard, D. T. Offermann, H. Hora, B. B. Gall, T. Burris-Mog, J. Rassuchine, C. Plechaty, J. Ren, "D-Cluster Converter Foil for Laser-Accelerated Deuteron Beams: Towards Deuteron-Beam-Driven Fast Ignition," *Fusion Science and Technology*, Vol. 60, No. 2, pp. 615-619 (2011); Y. E. Kim, "Theory of Bose-Einstein Condensation Mechanism for Deuteron-Induced Nuclear Reactions in Micro/Nano-Scale Metal Grains and Particles," *Naturwissenschaften*, Vol. 96, pp. 803-811 (2009). While the invention has been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein or by any of the following claims are desired to be protected.

What is claimed is:

1. A system comprising:
   a gas-loaded reaction generator including
      a gas source to provide one or more isotopes of hydrogen;
      a plurality of metallic micro-structures;
      a gas loading chamber containing the plurality of metallic micro-structures, the gas loading chamber structured to receive the one or more isotopes of hydrogen from the gas source; and
   a thermal transducer;
   wherein the gas-loaded reaction generator is operable to produce a quantity of heat energy; and
   wherein a first portion of the quantity of heat energy is deliverable to the thermal transducer.

2. The system of claim 1, further including a secondary heat device wherein a second portion of the quantity of heat energy is deliverable to the secondary heat device.

3. The system of claim 1, further including a vacuum and valve system capable of providing a gas loading pressure to the gas loading chamber with an amount of the one or more isotopes of hydrogen to form hydrogen clusters and cycling the gas loading pressure.

4. The system of claim 3, wherein the vacuum and valve system is further capable of directing a first quantity of the one or more isotopes of hydrogen from the gas source into the gas loading chamber under the gas loading pressure provided by the vacuum and valve system and directing a second quantity of the one or more isotopes of hydrogen from the gas source into the gas loading chamber thereby reducing the gas loading pressure.

5. The system of claim 1, wherein the plurality of metallic micro-structures further include a multilayer thin film device.

6. The system of claim 5, wherein the multilayer thin film device further includes:
   a first layer of a metallic material,
   a second layer of a material different from the metallic material of the first layer, and
   an interface between the first layer and the second layer configured to increase a quantity of dislocation sites between the first layer and the second layer.

7. The system of claim 6, wherein the first layer includes a metallic material selected from the group consisting of palladium, uranium, titanium, lithium, silver, gold, nickel and alloys thereof.

8. The system of claim 7, wherein the second layer includes a hydride of the metallic material selected for the first layer.

9. The system of claim 6, wherein the interface includes a material layer with a microscale thickness between the first layer and the second layer, the material layer being in a form of one or more of: particles, fibers, wires, mesh, and a porous layer.

10. The system of claim 1, wherein the plurality of metallic micro-structures further includes a plurality of metallic nanoparticles, the plurality of metallic nanoparticles being selected to provide for a predetermined hydrogen cluster formation density.

11. The system of claim 10, wherein the plurality of metallic nanoparticles includes a palladium rich alloy and the one or more isotopes of hydrogen includes deuterium ($D_2$).

12. The system of claim 10, wherein the plurality of metallic nanoparticles includes a nickel rich alloy and the one or more isotopes of hydrogen includes hydrogen ($H_2$).

13. The system of claim 1, further comprising a thermal management system, the thermal management system includes at least one of a heating element and a cooling element.

14. The system of claim 1, further comprising a reaction maintenance system selected from the group consisting of a thermal management system, an electrical discharge system, a radiofrequency discharge system, and a magnetic field system.

15. A distributed energy system comprising:
   a gas-loaded reaction generator including
      a gas source to provide one or more isotopes of hydrogen;
      a plurality of metallic micro-structures;
      a gas loading chamber containing the plurality of metallic micro-structures, the gas loading chamber structured to receive the one or more isotopes of hydrogen from the gas source;
      a means for converting thermal energy; and
      a means for applying thermal energy;
   wherein the gas-loaded reaction generator is operable to produce a quantity of thermal energy; and
   wherein a first portion of the quantity of thermal energy is deliverable to the means for converting thermal energy and a second portion of the quantity of thermal energy is deliverable to the means for applying thermal energy.

16. An energy system comprising:
   a gas-loaded reaction generator capable of producing thermal energy including
      a gas source configured to provide one or more isotopes of hydrogen;
      a plurality of metallic micro-structures;
      a gas loading chamber containing the plurality of metallic micro-structures, the gas loading chamber being structured to receive the one or more isotopes of hydrogen from the gas source;
      a gas loading system operable to provide a gas loading pressure to the gas loading chamber containing the plurality of metallic micro-structures with an amount of one or more isotopes of hydrogen to form hydrogen clusters; and
   a thermal transducer capable of converting a first portion of the thermal energy.

17. The energy system of claim 16, wherein the gas loading system is operable to direct a first quantity of the one or more isotopes of hydrogen from the gas source into the gas loading chamber under the gas loading pressure provided by the gas loading system and to direct a second quantity of the one or more isotopes of hydrogen from the gas source into the gas loading chamber to reduce the gas loading pressure.

18. The energy system of claim 17, wherein the plurality of metallic micro-structures further include a multilayer thin film device including
   a first layer of a first material;
   a second layer of a material distinct from the first material; and
   an interface between the first layer and the second layer capable of increasing a quantity of dislocation sites between the first layer and the second layer.

19. The energy system of claim 17, wherein the plurality of metallic micro-structures further include a plurality of metallic nanoparticles, the plurality of metallic nanoparticles being selected to provide for a predetermined hydrogen cluster formation density.

20. The energy system of claim 19, wherein the plurality of metallic nanoparticles includes a palladium rich alloy and the one or more isotopes of hydrogen includes deuterium ($D_2$).

21. The energy system of claim 19, wherein the plurality of metallic nanoparticles include a nickel rich alloy to produce a quantity of nanoparticles and the one or more isotopes of hydrogen further includes hydrogen ($H_2$).

22. The energy system of claim 17, further including a heat recovery device capable of applying a second portion of the thermal energy.

* * * * *